(12) United States Patent
Lee

(10) Patent No.: US 9,360,969 B2
(45) Date of Patent: Jun. 7, 2016

(54) METHOD OF FABRICATING CAPACITIVE TOUCH-SCREEN PANEL

(75) Inventor: Yong Hoon Lee, Yongin-Si (KR)

(73) Assignee: E&H. CO., LTD., Anseong-Si (KR)

( * ) Notice: Subject to any disclaimer, the term of this patent is extended or adjusted under 35 U.S.C. 154(b) by 1460 days.

(21) Appl. No.: 12/747,393

(22) PCT Filed: Sep. 25, 2009

(86) PCT No.: PCT/KR2009/005474
§ 371 (c)(1),
(2), (4) Date: Dec. 21, 2010

(87) PCT Pub. No.: WO2010/095798
PCT Pub. Date: Aug. 26, 2010

(65) Prior Publication Data
US 2011/0099805 A1    May 5, 2011

(30) Foreign Application Priority Data

Feb. 23, 2009   (KR) .......................... 10-2009-0014913

(51) Int. Cl.
*H05K 3/02*       (2006.01)
*G06F 3/044*      (2006.01)

(52) U.S. Cl.
CPC ...... *G06F 3/044* (2013.01); *G06F 2203/04103* (2013.01); *Y10T 29/49155* (2015.01)

(58) Field of Classification Search
CPC ................... G06F 3/044; G06F 3/047; G06F 2203/04103; H05K 3/064; H05K 2203/0571; Y10T 29/49126; Y10T 29/49155; Y10T 29/49156
USPC ............ 29/830, 846, 849, 852; 174/261, 265; 178/18.03; 345/173, 174; 439/12
See application file for complete search history.

(56) References Cited

U.S. PATENT DOCUMENTS 6,137,427 A     10/2000  Binstead
6,188,391 B1 *   2/2001  Seely et al. .................... 345/173
(Continued)

FOREIGN PATENT DOCUMENTS

CN      201107503 Y    8/2008
JP        3130570 U    3/2007
(Continued)

*Primary Examiner* — Donghai D Nguyen
(74) *Attorney, Agent, or Firm* — The Webb Law Firm

(57) ABSTRACT

Provided is a method of fabricating a capacitive touch-screen panel. The method includes preparing first and second substrates having first lateral surfaces on which first and second transparent conductive layers for forming first and second transparent electrode pattern units are disposed. Each of the first and second substrates has a screen region and an inactive region. Second lateral surfaces of the first and second substrates are bonded to each other by an interlayer adhesive. First and second metal layers for forming first and second outer electrode interconnections are disposed on exposed surfaces of the first and second transparent conductive layers, respectively. Double-side exposure and etching processes are performed to form the first transparent electrode pattern unit and the first outer electrode interconnection on the screen region and the inactive region of the first lateral surface of the first substrate, respectively, and simultaneously, form the second transparent electrode pattern unit and the second outer electrode interconnection on the screen region and the inactive region of the first lateral surface of the second substrate, respectively. The first and second outer electrode interconnections are electrically connected to the first and second transparent electrode pattern units, respectively. The method can efficiently reduce the fabrication cost of a touch screen and greatly simplify the fabrication process of the touch-screen panel.

6 Claims, 32 Drawing Sheets

(56) References Cited

U.S. PATENT DOCUMENTS

| | | | |
|---|---|---|---|
| 6,555,209 B1 * | 4/2003 | Yoshimura et al. | 174/261 |
| 6,819,316 B2 * | 11/2004 | Schulz et al. | 345/174 |
| 7,030,860 B1 | 4/2006 | Hsu et al. | |
| 7,102,711 B2 | 9/2006 | Yanagawa et al. | |
| 8,264,466 B2 * | 9/2012 | Maag et al. | 345/173 |
| 8,462,278 B2 * | 6/2013 | Nashiki et al. | 349/12 |
| 2005/0156906 A1 | 7/2005 | Chiu et al. | |
| 2005/0190161 A1 | 9/2005 | Hong et al. | |
| 2007/0063876 A1 | 3/2007 | Wong | |
| 2008/0211395 A1 | 9/2008 | Koshihara et al. | |
| 2009/0002337 A1 | 1/2009 | Chang | |
| 2009/0046077 A1 | 2/2009 | Tanaka et al. | |
| 2011/0032193 A1 | 2/2011 | Szalkowski | |
| 2011/0063247 A1 | 3/2011 | Min | |

FOREIGN PATENT DOCUMENTS

| | | |
|---|---|---|
| JP | 20089225 A | 1/2008 |
| KR | 20020019671 A | 3/2002 |
| KR | 1020040056745 A | 7/2004 |
| KR | 1020050072680 A | 7/2005 |
| KR | 1020080110158 A | 12/2008 |
| KR | 1020090015414 A | 2/2009 |
| WO | 9527334 A1 | 10/1995 |

* cited by examiner

FIG. 13
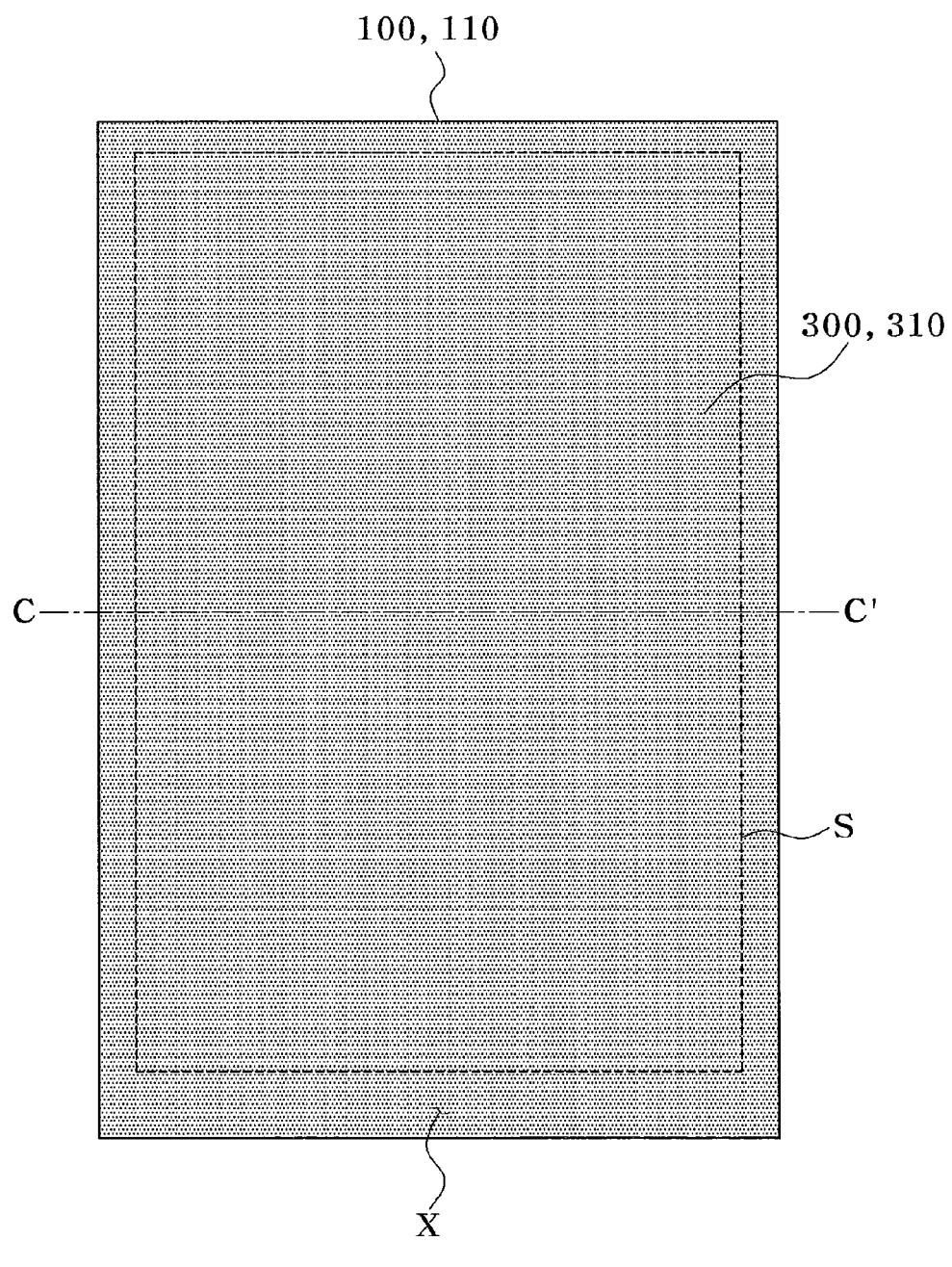
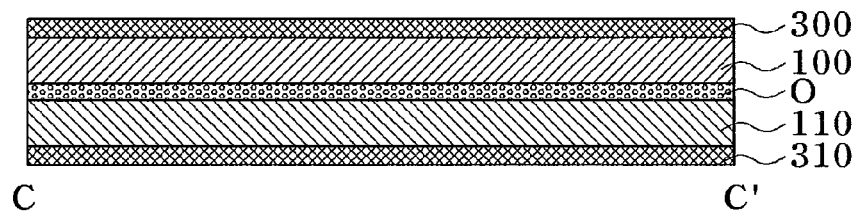

FIG. 15
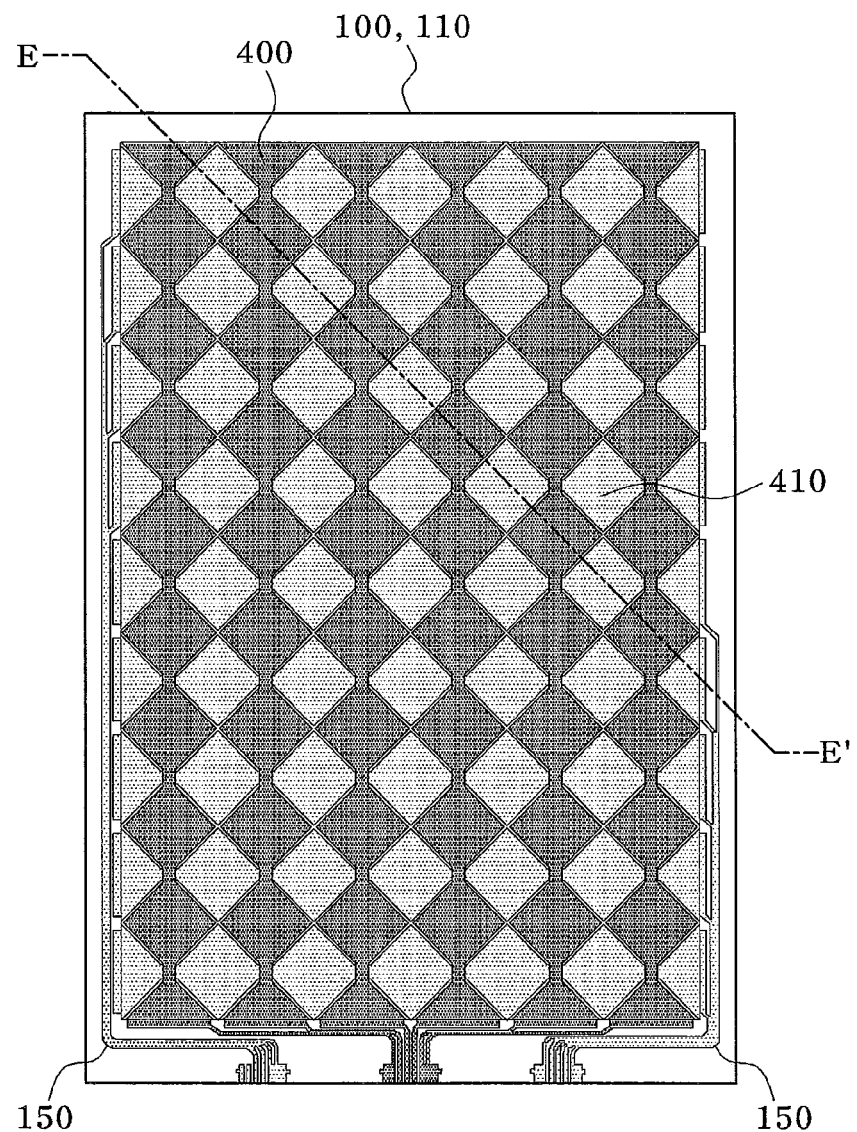
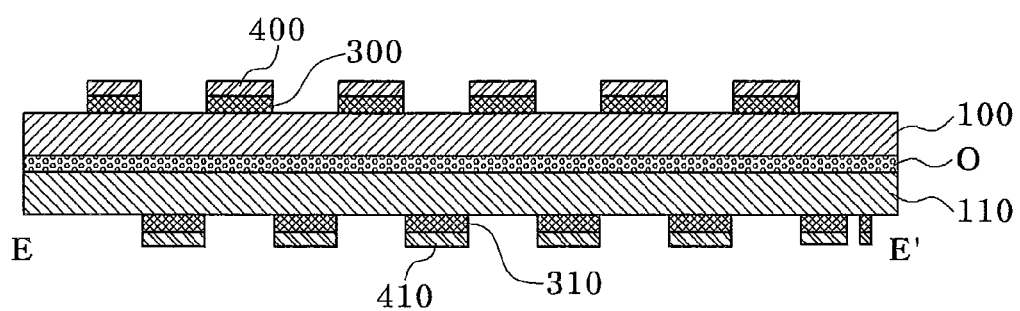

FIG. 16
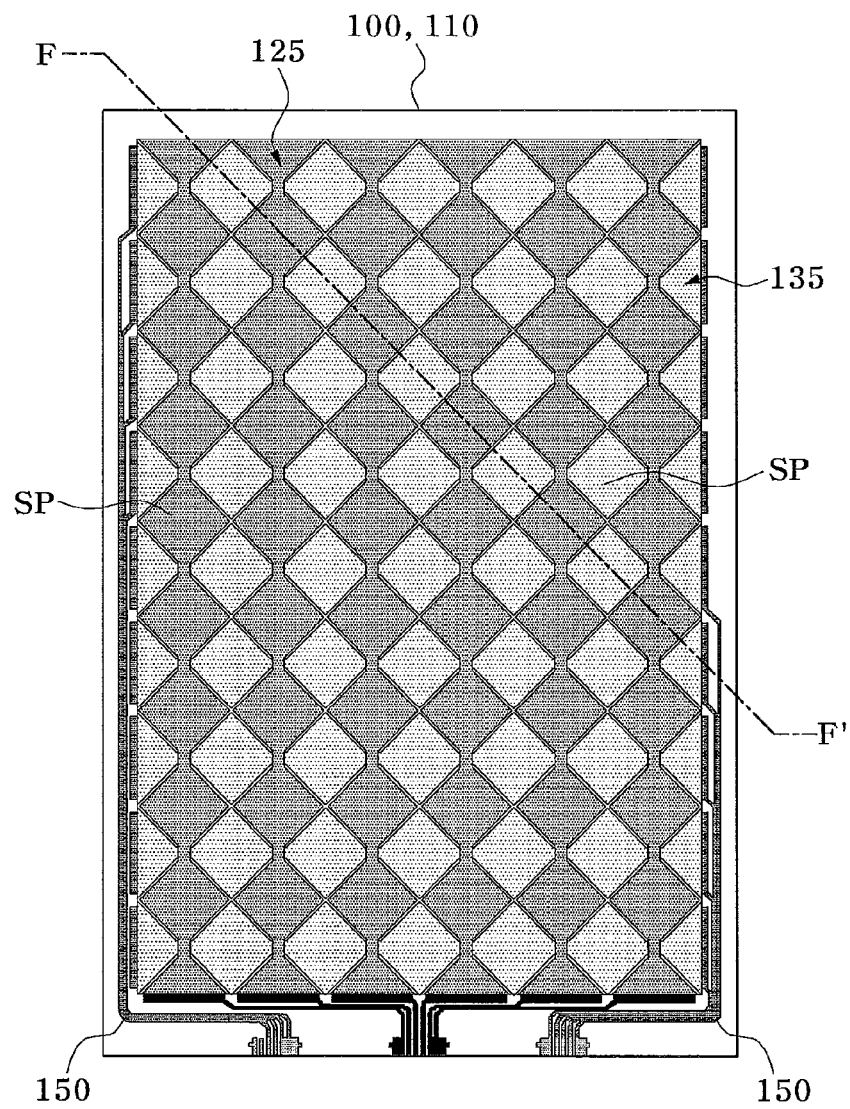
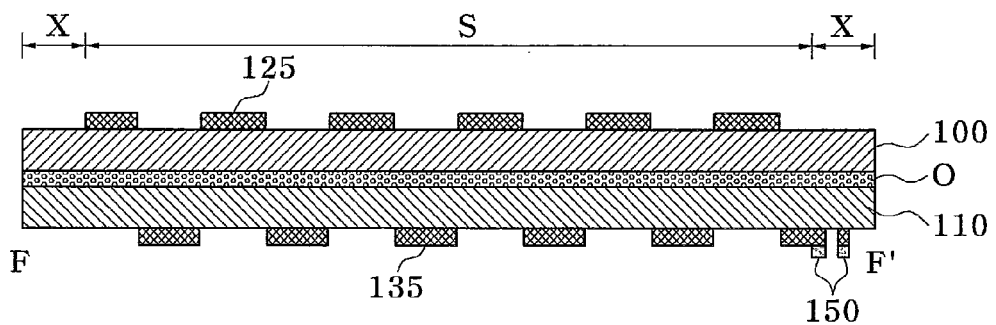

FIG. 19
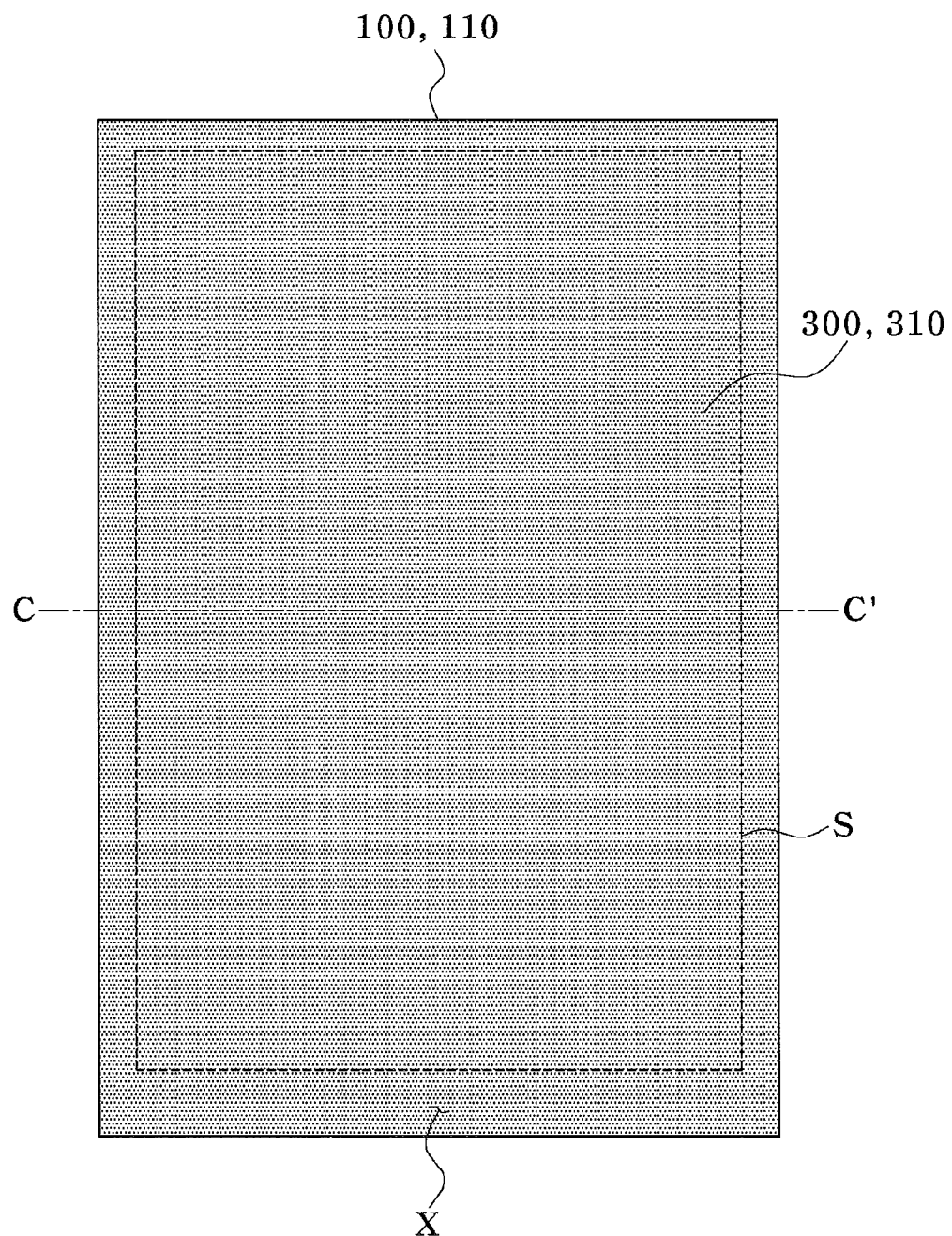
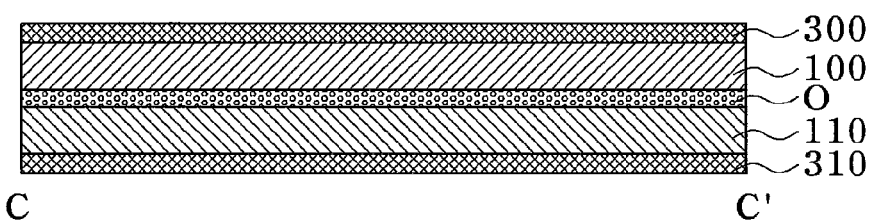

FIG. 21
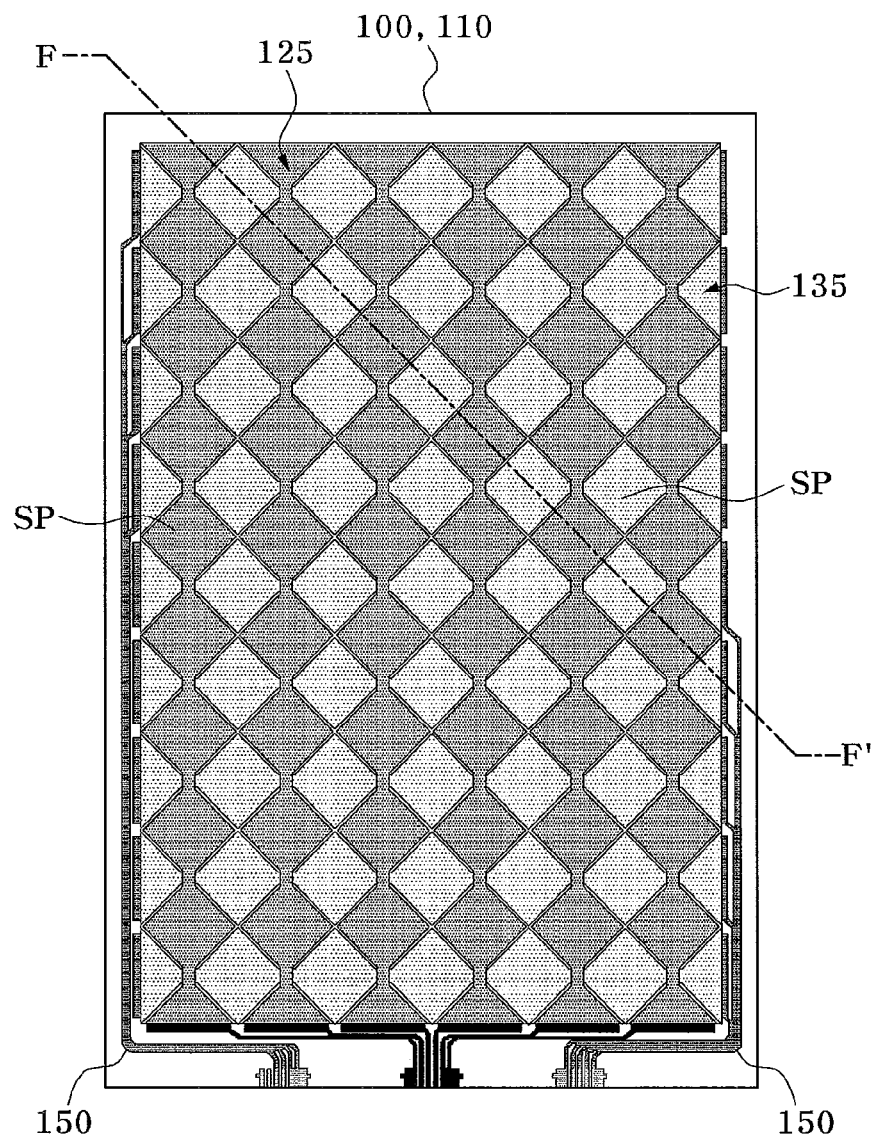
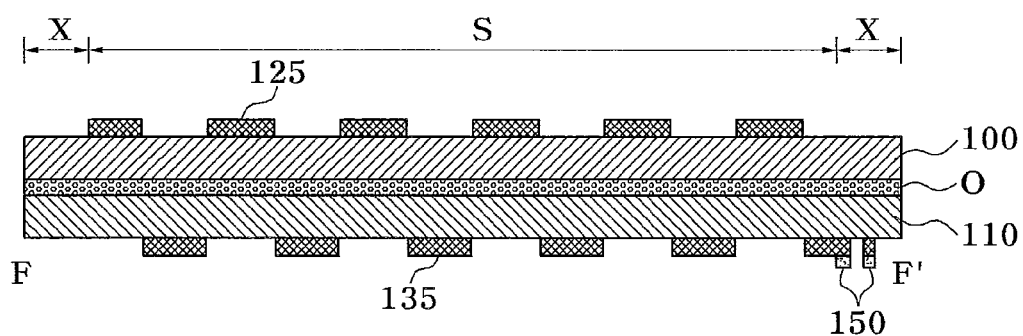

FIG. 26
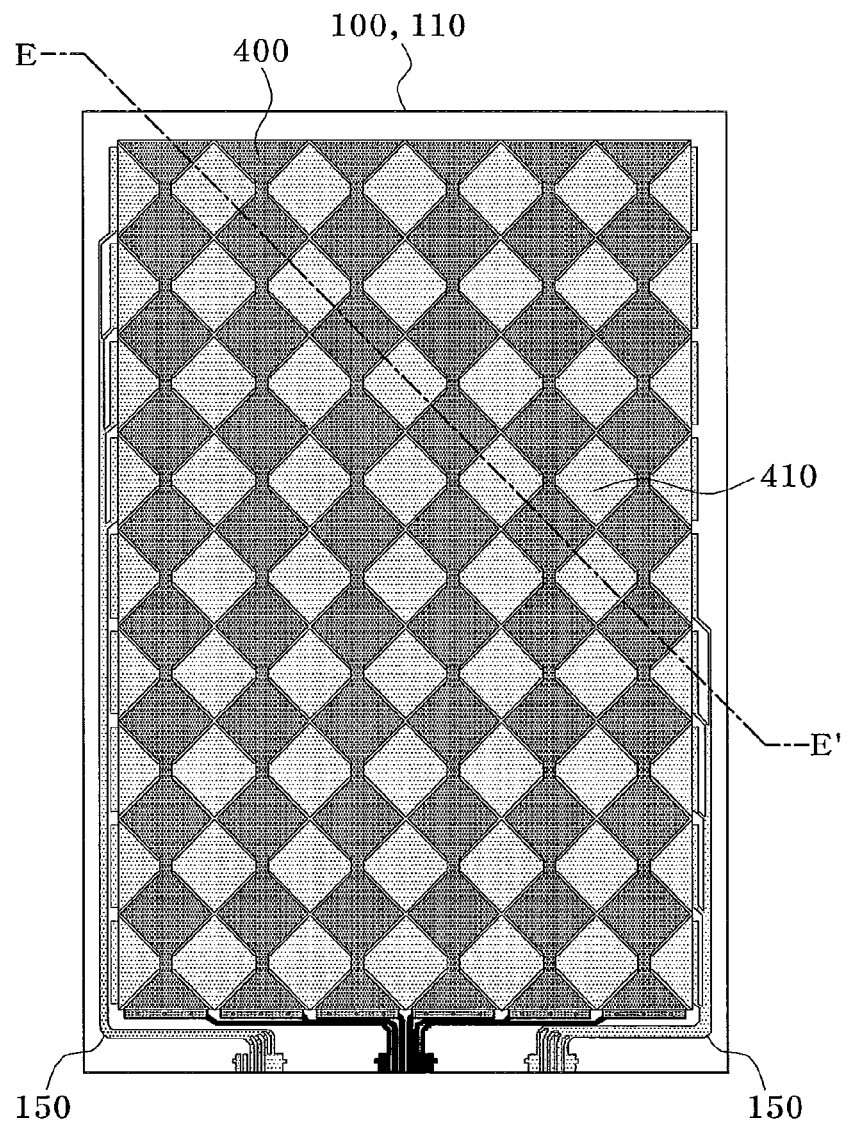
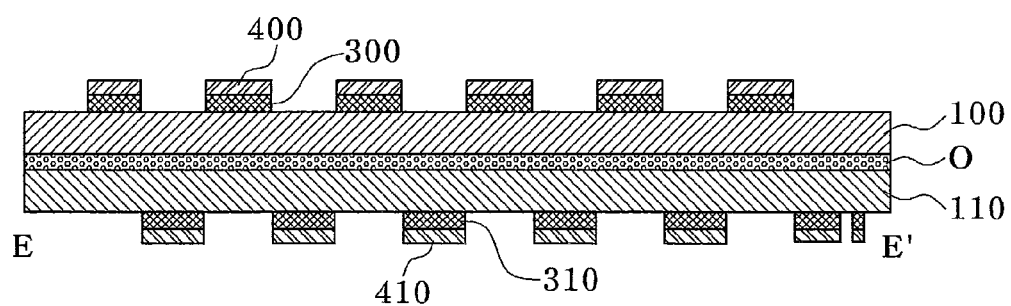

FIG. 27
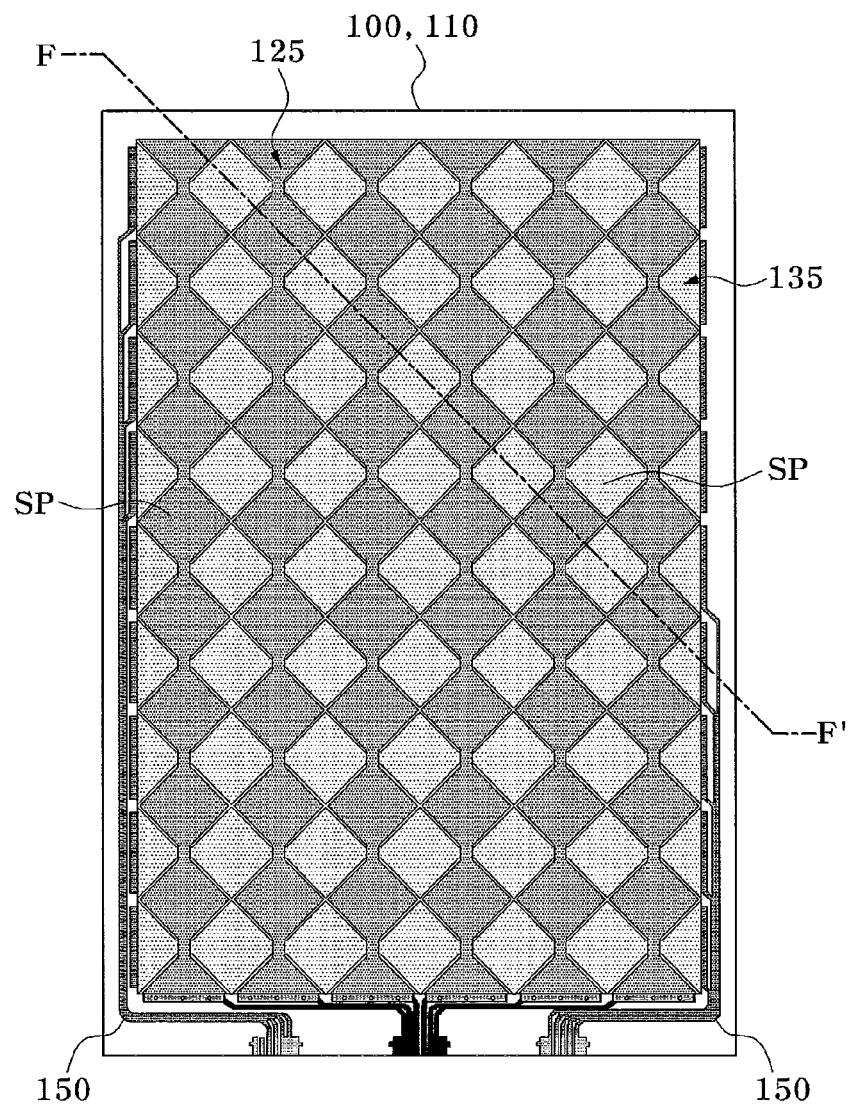
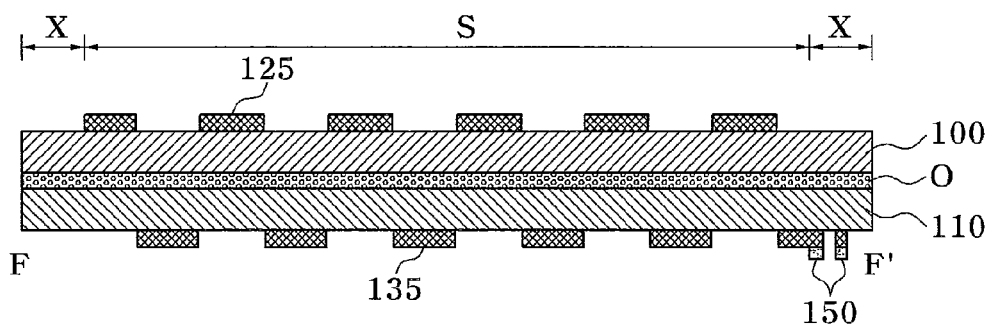

FIG. 30
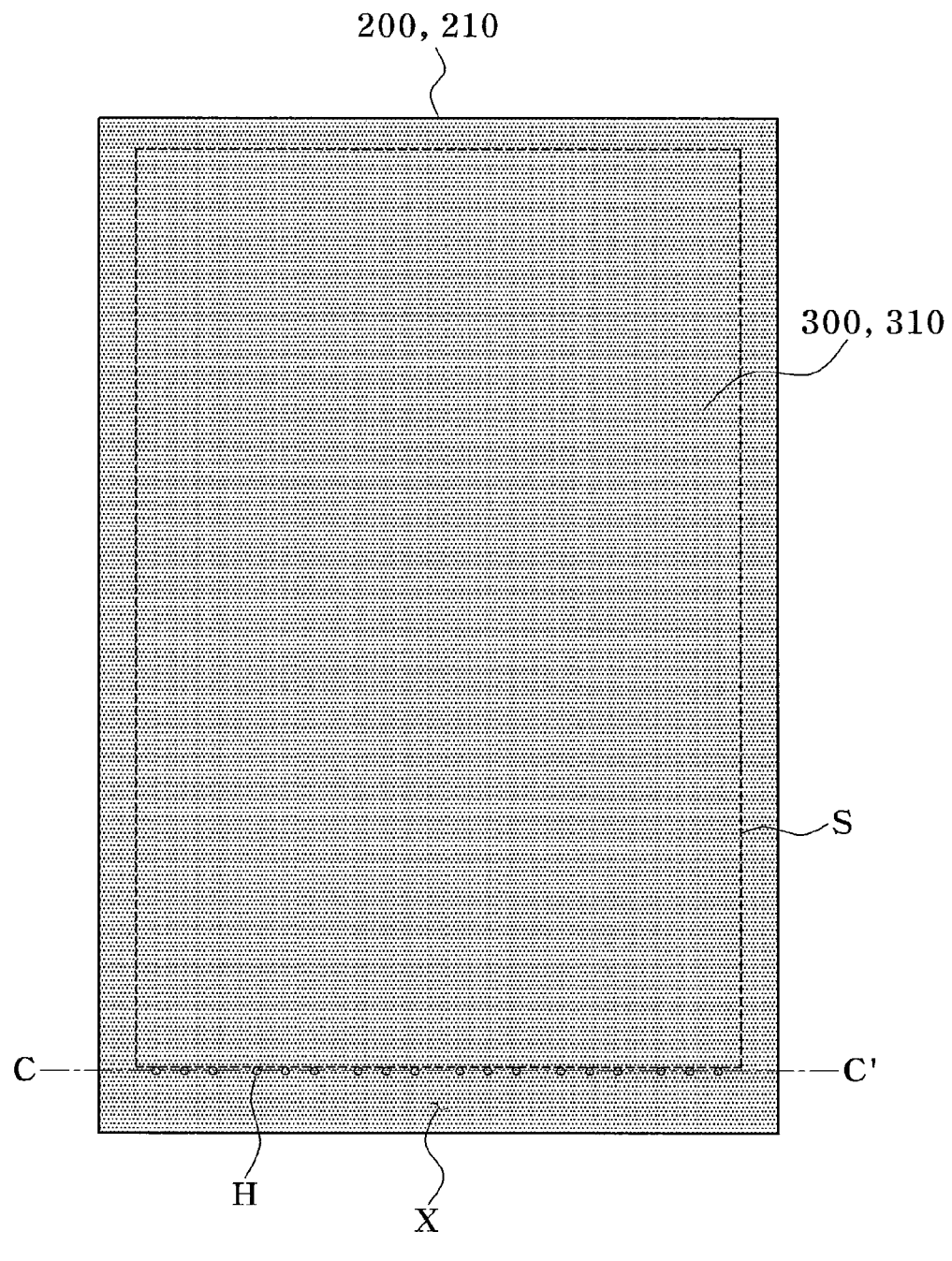
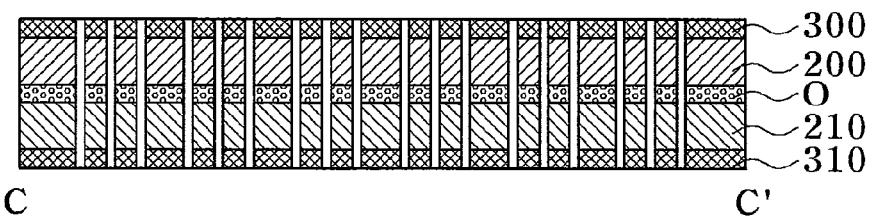

METHOD OF FABRICATING CAPACITIVE TOUCH-SCREEN PANEL

CROSS-REFERENCE TO RELATED APPLICATION

This application claims priority to and the benefit of Korean Patent Application No. 2009-14913, filed on Feb. 23, 2009, the disclosure of which is incorporated herein by reference in its entirety.

BACKGROUND

1. Field of the Invention

The present invention relates to a method of fabricating a capacitive touch-screen panel, and more particularly, to a method of fabricating a capacitive touch-screen panel that can efficiently reduce the fabrication cost of a touch screen and greatly simplify the fabrication process of the touch-screen panel.

2. Discussion of Related Art

In general, a touch screen is an input apparatus that allows all types of people to dialogically and intuitively manipulate a computer using only contacts of a finger with buttons indicated on a display unit.

Touch screens are divided into resistive touch screens, capacitive touch screens, infrared touch screens, and ultrasonic touch screens. Currently, resistive touch screens are being widely used, while capacitive touch screens are being used to minimize thicknesses.

Specifically, a capacitive touch screen includes a conductive light transmission plate formed of indium tin oxide (ITO), an electrode unit formed of powdered silver paint on an edge of the conductive light transmission plate, and an insulating coating unit configured to insulate a lower portion of the electrode unit from other elements.

Meanwhile, the conductive light transmission plate includes an ITO film formed of a light-transmissive resin and an ITO coating layer formed by coating a conductive material under the ITO film.

In the case of the above-described conventional capacitive touch screen, when a finger contacts a top surface of the conductive light transmission plate, each of electrodes disposed on four sides of the top surface of the conductive light transmission plate can detect a touched position with a variation in capacitance due to the contact with the finger.

However, the following problems may be caused during the fabrication of a conventional capacitive touch-screen panel.

First, after patterning individual touch screens, it is difficult to maintain a precise margin during an interlayer lamination process. That is, signal interference and an aperture ratio may be increased due to shift or overlapping.

Second, it is difficult to maintain a precise alignment margin between a conventional light transmission plate formed of ITO and an outer electrode unit. That is, it may be difficult to precisely control a screen printing process using an Ag paste through an outer reference hole and also hard to check the light transmissions plate with the naked eye.

Third, after performing a screen printing process, when an Ag paste is cured at a high temperature, cracks may occur in a fine ITO line.

Fourth, many defects such as air bubbles, alien substances and scratches, may occur during a sheet-state interlayer lamination process.

Fifth, since a sheet-state film is thin, it may be difficult to treat the sheet-state film and prevent the sheet-state film from being wrinkled before a lamination process.

SUMMARY OF THE INVENTION

The present invention is directed to a method of fabricating a capacitive touch-screen panel, which can effectively reduce fabrication costs of a touch screen and greatly simplify the entire process of fabricating the touch-screen panel.

According to an aspect of the present invention, there is provided a method of fabricating capacitive touch-screen panel. The method includes: preparing first and second substrates having first lateral surfaces on which first and second transparent conductive layers for forming first and second transparent electrode pattern units are disposed, each substrate having a screen region and an inactive region; bonding second lateral surfaces of the first and second substrates to each other by an interlayer adhesive; depositing first and second metal layers for forming first and second outer electrode interconnections on exposed surfaces of the first and second transparent conductive layers, respectively; and performing double-side exposure and etching processes to form the first transparent electrode pattern unit and the first outer electrode interconnection on the screen region and the inactive region of the first lateral surface of the first substrate, respectively, and simultaneously, form the second transparent electrode pattern unit and the second outer electrode interconnection on the screen region and the inactive region of the first lateral surface of the second substrate, respectively. The first and second outer electrode interconnections are electrically connected to the first and second transparent electrode pattern units, respectively.

According to another aspect of the present invention, there is provided a method of fabricating a capacitive touch-screen panel. The method includes: preparing first and second substrates having first lateral surfaces on which first and second transparent conductive layers for forming first and second transparent electrode pattern units are disposed, each substrate having a screen region and an inactive region; depositing first and second metal layers for first and second outer electrode interconnections on exposed surfaces of the first and second transparent conductive layers; bonding second lateral surfaces of the first and second substrates to each other by an interlayer adhesive; and performing double-side exposure and etching processes to form the first transparent electrode pattern unit and the first outer electrode interconnection on the screen region and the inactive region of the first lateral surface of the first substrate, respectively, and simultaneously, form the second transparent electrode pattern unit and the second outer electrode interconnection on the screen region and the inactive region of the first lateral surface of the second substrate, respectively. The first and second outer electrode interconnections are electrically connected to the first and second transparent electrode pattern units, respectively.

The formation of the first and second transparent electrode pattern units and the first and second outer electrode interconnections may include: sequentially blanket etching the first metal layer and the first transparent conductive layer to expose predetermined portions of the screen region and the inactive region of the first lateral surface of the first substrate and the second metal layer and the second transparent conductive layer to expose predetermined portions of the screen region and the inactive region of the first lateral surface of the second substrate using a photolithography process; and selectively etching the first and second metal layers to expose the first and second transparent conductive layers on the screen regions of the first and second substrates.

According to still another aspect of the present invention, there is provided a method of fabricating a capacitive touch-screen panel. The method includes: preparing first and second substrates having first lateral surfaces on which first and second transparent conductive layers for forming first and second transparent electrode pattern units are disposed, each substrate having a screen region and an inactive region; bonding second lateral surfaces of the first and second substrates to each other by an interlayer adhesive and forming at least one through hole for forming at least one via hole on the inactive regions of the first and second substrates to penetrate the first and second transparent conductive layers; depositing the first and second metal layers on exposed surfaces of the first and second transparent conductive layers having the respective through holes; and performing double-side exposure and etching processes to form the first transparent electrode pattern unit on the screen region of the first lateral surface of the first substrate and simultaneously, form the second transparent electrode pattern unit on the screen region of the first lateral surface of the second substrate, and to form first and second outer electrode interconnections on the inactive region of the first lateral surface of the second substrate. The first and second outer electrode interconnections are electrically connected to the first and second transparent electrode pattern units, respectively, through the respective via holes.

The formation of the first and second transparent electrode pattern units and the first and second outer electrode interconnections may include: sequentially blanket etching the first metal layer and the first transparent conductive layer to expose predetermined portions of the screen region and the inactive region of the first lateral surface of the first substrate and the second metal layer and the second transparent conductive layer to expose predetermined portions of the screen region and the inactive region of the first lateral surface of the second substrate using a photolithography process; and selectively etching the first and second metal layers on the screen regions of the first and second substrates.

According to yet another aspect of the present invention, there is provided a method of fabricating a capacitive touch-screen panel. The method includes: preparing first and second substrates having first lateral surfaces on which first and second transparent conductive layers for forming first and second transparent electrode pattern units are disposed, each substrate having a screen region and an inactive region; bonding second lateral surfaces of the first and second substrates to each other by an interlayer adhesive; selectively depositing first and second metal layers for forming first and second outer electrode interconnections using first and second masks on predetermined exposed surfaces of the first and second transparent conductive layers formed on the inactive regions of the first and second substrates; and performing double-side exposure and etching processes to form the first transparent electrode pattern unit and the first outer electrode interconnection on the screen region and the inactive region of the first lateral surface of the first substrate, respectively, and simultaneously, form the second transparent electrode pattern unit and the second outer electrode interconnection on the screen region and the inactive region of the first lateral surface of the second substrate, respectively. The first and second outer electrode interconnections are electrically connected to the first and second transparent electrode pattern units, respectively.

According to yet another aspect of the present invention, there is provided a method of fabricating a capacitive touch-screen panel. The method includes: preparing first and second substrates having first lateral surfaces on which first and second transparent conductive layers for forming first and second transparent electrode pattern units are disposed, each substrate having a screen region and an inactive region; selectively depositing first and second metal layers for forming first and second outer electrode interconnections using first and second masks on predetermined exposed surfaces of the first and second transparent conductive layers formed on the inactive regions of the first and second substrates, respectively; bonding second lateral surfaces of the first and second substrates to each other by an interlayer adhesive; and performing double-side exposure and etching processes to form the first transparent electrode pattern unit and the first outer electrode interconnection on the screen region and the inactive region of the first lateral surface of the first substrate, respectively, and simultaneously, form the second transparent electrode pattern unit and the second outer electrode interconnection on the screen region and the inactive region of the first lateral surface of the second substrate, respectively. The first and second outer electrode interconnections are electrically connected to the first and second transparent electrode pattern units, respectively.

The formation of the first and second transparent electrode pattern units and the first and second outer electrode interconnections may include blanket etching the first and second transparent conductive layers and the first and second metal layers using a photolithography process to expose predetermined portions of the screen region and the inactive region of the first lateral surfaces of the first and second substrates, respectively.

According to yet another aspect of the present invention, there is provided a method of fabricating a capacitive touch-screen panel. The method includes: preparing first and second substrates having first lateral surfaces on which first and second transparent conductive layers for forming first and second transparent electrode pattern units are disposed, each substrate having a screen region and an inactive region; bonding second lateral surfaces of the first and second substrates by an interlayer adhesive and forming at least one through hole for forming at least one via hole on the inactive regions of the first and second substrates to penetrate the first and second transparent conductive layers; selectively depositing first and second metal layers using first and second masks on predetermined exposed surfaces of the first and second transparent conductive layers formed on the inactive regions of the first and second substrates; and performing double-side exposure and etching processes to form the first transparent electrode pattern unit on the screen region of the first lateral surface of the first substrate and simultaneously, form the second transparent electrode pattern unit on the screen region of the first lateral surface of the second substrate, and to form first and second outer electrode interconnections on the inactive region of the first lateral surface of the second substrate. The first and second outer electrode interconnections are electrically connected to the first and second transparent electrode pattern units, respectively, through the respective via holes.

The formation of the first and second transparent electrode pattern units and the first and second outer electrode interconnections may include blanket etching the first and second transparent conductive layers and the first and second metal layers using a photolithography process to expose predetermined regions of the screen region and the inactive region of the first lateral surfaces of the first and second substrates, respectively.

Each of the first and second substrates may be a transparent film formed of at least one selected from the group consisting of glass, polyethylene terephthalate (PET), polyethylene naphthalate (PEN), polyimide (PI), and acryl.

The method may further include bonding a single-sided external driver to the inactive region of the second substrate to be electrically connected to the first and second outer electrode interconnections.

According to yet another aspect of the present invention, there is provided a method of fabricating a capacitive touch-screen panel. The method includes: preparing a substrate having first and second lateral surfaces on which first and second transparent conductive layers for forming first and second transparent electrode pattern units are disposed, the substrate having a screen region and an inactive region; depositing first and second metal layers for forming first and second outer electrode interconnections on exposed surfaces of the first and second transparent conductive layers; and performing double-side exposure and etching processes to form the first transparent electrode pattern unit and the first outer electrode interconnection on the screen region and the inactive region of the first lateral surface of the substrate, respectively, and simultaneously, form the second transparent electrode pattern unit and the second outer electrode interconnection on the screen region and the inactive region of the second lateral surface of the substrate, respectively. The first and second outer electrode interconnections are electrically connected to the first and second transparent electrode pattern units, respectively.

According to yet another aspect of the present invention, there is provided a method of fabricating a capacitive touch-screen panel. The method includes: preparing a substrate having first and second lateral surfaces on which first and second transparent conductive layers for forming first and second transparent electrode pattern units are disposed, the substrate having a screen region and an inactive region; forming a plurality of through holes for forming a plurality of via holes on the inactive region of the substrate to penetrate the first and second transparent conductive layers; depositing first and second metal layers on exposed surfaces of the first and second transparent conductive layers having the respective through holes; and performing double-side exposure and etching processes to form the first transparent electrode pattern unit on the screen region of the first lateral surface of the substrate and simultaneously, form the second transparent electrode pattern unit on the screen region of the second lateral surface of the substrate, and to form first and second outer electrode interconnections on the inactive region of the second lateral surface of the substrate. The first and second outer electrode interconnections are electrically connected to the first and second transparent electrode pattern units, respectively, through the respective via holes.

According to yet another aspect of the present invention, there is provided a method of fabricating a capacitive touch-screen panel. The method includes: preparing a substrate having first and second lateral surfaces on which first and second transparent conductive layers for forming first and second transparent electrode pattern units are disposed, the substrate having a screen region and an inactive region; selectively depositing first and second metal layers for forming first and second outer electrode interconnections using first and second masks on predetermined exposed surfaces of the first and second transparent conductive layers formed on the inactive region of the substrate; and performing double-side exposure and etching processes to form the first transparent electrode pattern unit and the first outer electrode interconnection on the screen region and the inactive region of the first lateral surface of the substrate, respectively, and simultaneously, form the second transparent electrode pattern unit and the second outer electrode interconnection on the screen region and the inactive region of the second lateral surface of the substrate, respectively. The first and second outer electrode interconnections are electrically connected to the first and second transparent electrode pattern units, respectively.

According to yet another aspect of the present invention, there is provided a method of fabricating a capacitive touch-screen panel. The method includes: preparing a substrate having first and second lateral surfaces on which first and second transparent conductive layers for forming first and second transparent electrode pattern units are disposed, the substrate having a screen region and an inactive region; forming at least one through hole for forming at least one via hole on the inactive region of the substrate to penetrate the first and second transparent conductive layers; selectively depositing the first and second metal layers using first and second masks on predetermined exposed surfaces of the first and second transparent conductive layers formed on the inactive regions of the substrate; and performing double-side exposure and etching processes to form the first transparent electrode pattern unit on the screen region of the first lateral surface of the substrate and simultaneously, form the second transparent electrode pattern unit on the screen region of the second lateral surface of the substrate, and to form first and second outer electrode interconnections on the inactive region of the second lateral surface of the substrate. The first and second outer electrode interconnections are electrically connected to the first and second transparent electrode pattern units, respectively.

The substrate may be a transparent film formed of at least one selected from the group consisting of PET, PI, acryl, PEN, and glass.

The method may further include bonding a single-sided external driver to the inactive region of the substrate to electrically connect the single-sided external driver to the first and second outer electrode interconnections.

The first and second transparent conductive layers may be formed of at least one selected from the group consisting of indium tin oxide (ITO), indium zinc oxide (IZO), aluminum (Al)-doped ZnO (AZO), carbon nanotubes (CNT), poly(3,4-ethylenedioxythiophene) (PEDOT), silver (Ag) transparent ink, and copper (Cu) transparent ink.

The deposition of the first and second metal layers may include depositing at least one material selected from the group consisting of copper (Cu), nickel (Ni), aluminum (Al), chromium (Cr), molybdenum (Mo), silver (Ag), and gold (Au) using a sputtering process.

A plurality of first transparent electrode patterns of the first transparent electrode pattern unit may be spaced a predetermined distance apart from one another in a widthwise direction and connected to one another in a lengthwise direction such that vertices of a plurality of triangular or rectangular sensing pads are spaced a predetermined distance apart from one another, and a plurality of second transparent electrode patterns of the second transparent electrode pattern unit may be spaced a predetermined distance apart from one another in a lengthwise direction at right angles to one another between the respective first transparent electrode patterns and connected to one another in a widthwise direction such that vertices of a plurality of triangular or rectangular sensing pads are spaced a predetermined distance apart from one another so that the first and second transparent electrode pattern units can form a right-angled grating shape.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 11 through 16 are plan and cross-sectional views illustrating a method of fabricating a capacitive touch-screen panel according to a first exemplary embodiment of the present invention;

FIGS. 17 through 22 are plan and cross-sectional views illustrating a method of fabricating a capacitive touch-screen panel according to a second exemplary embodiment of the present invention;

FIGS. 23 through 27 are plan and cross-sectional views illustrating a method of fabricating a capacitive touch-screen panel according to a third exemplary embodiment of the present invention; and FIGS. 28 through 32 are plan and cross-sectional views illustrating a method of fabricating a capacitive touch-screen panel according to a fourth exemplary embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
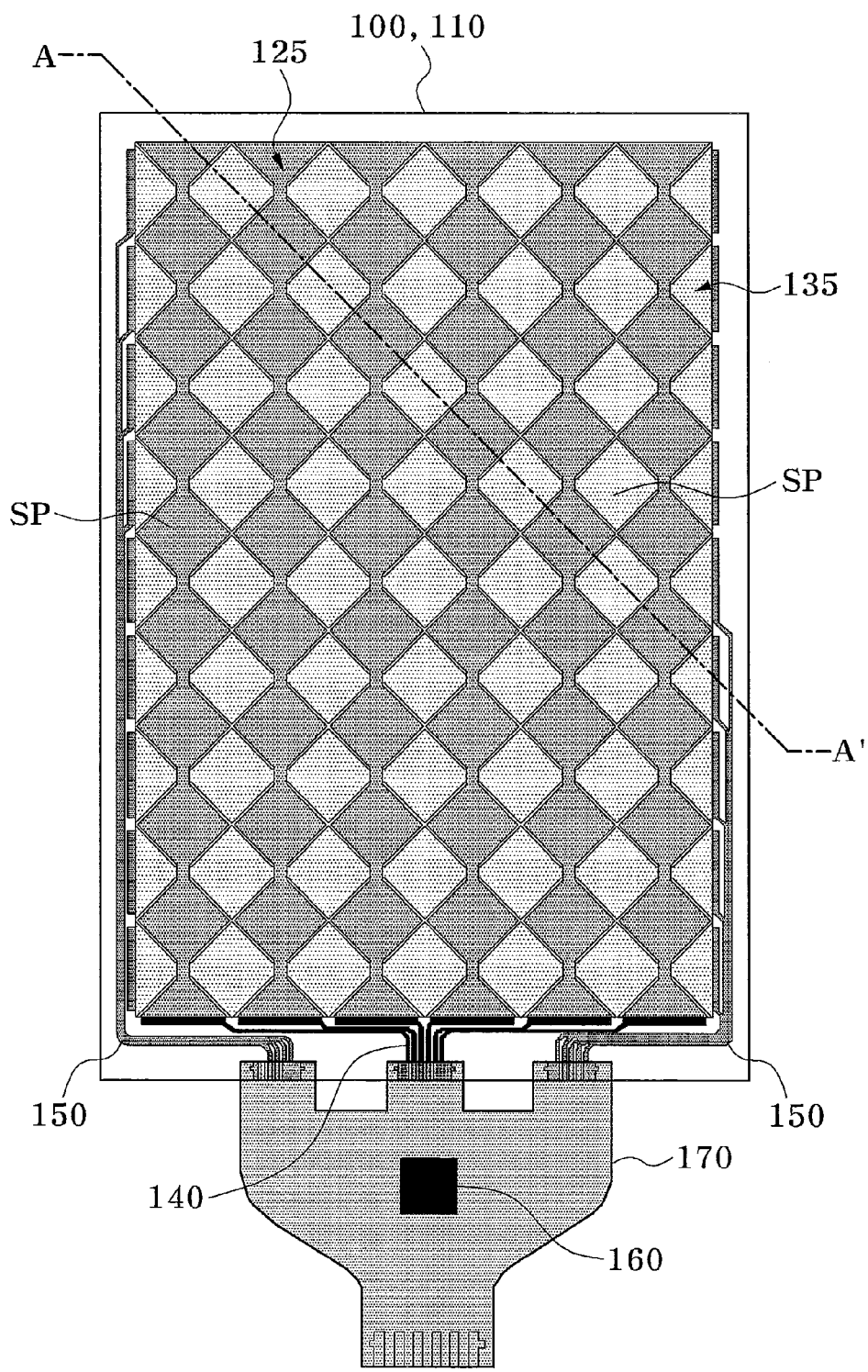
FIG. 1 is a plan view of a capacitive touch-screen panel according to an exemplary embodiment of the present invention.
Figure 2:
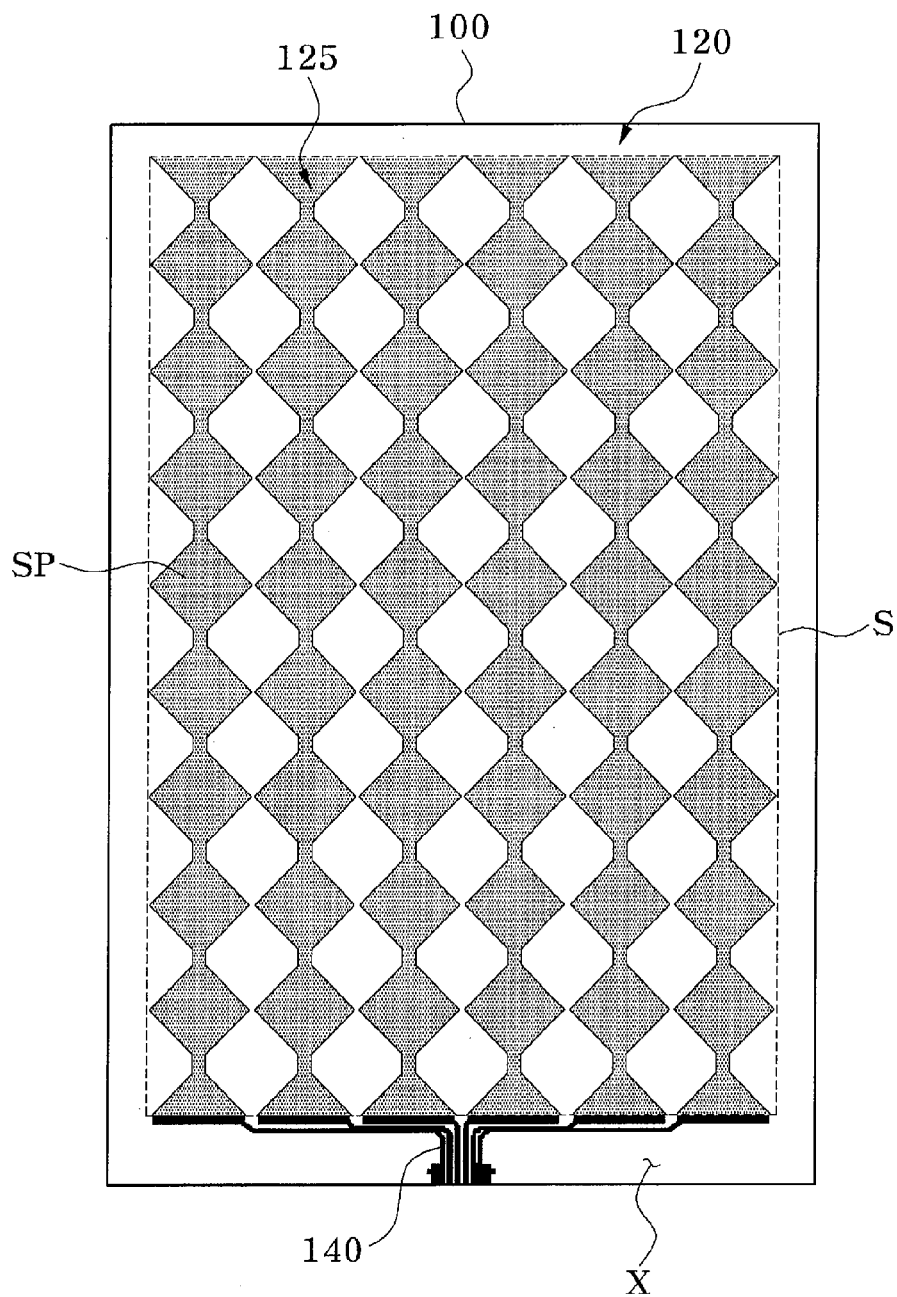
FIGS. 2 and 3 are plan views of only first and second substrate portions of FIG. 1, respectively.
Figure 3:
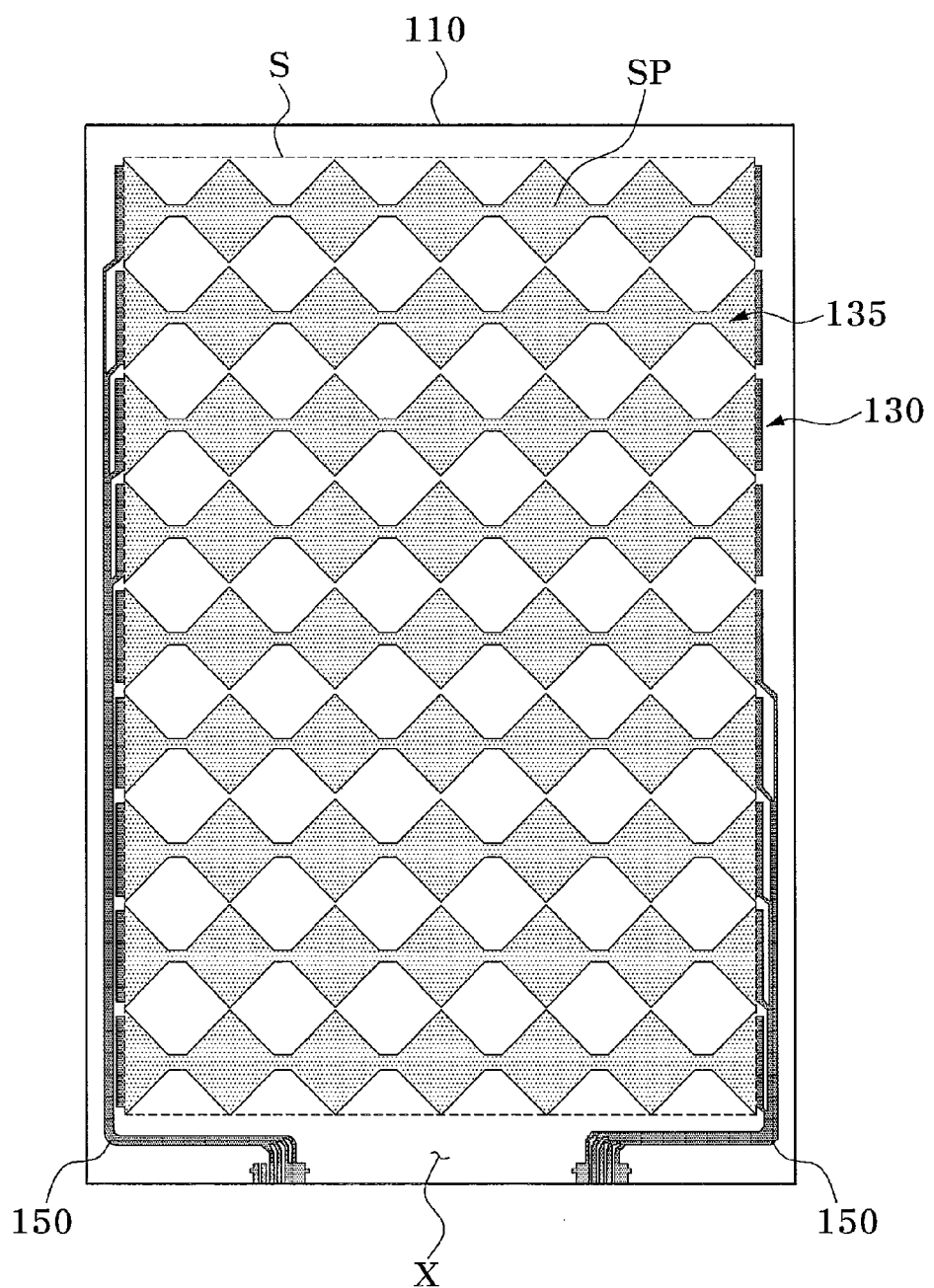
Figure 4:
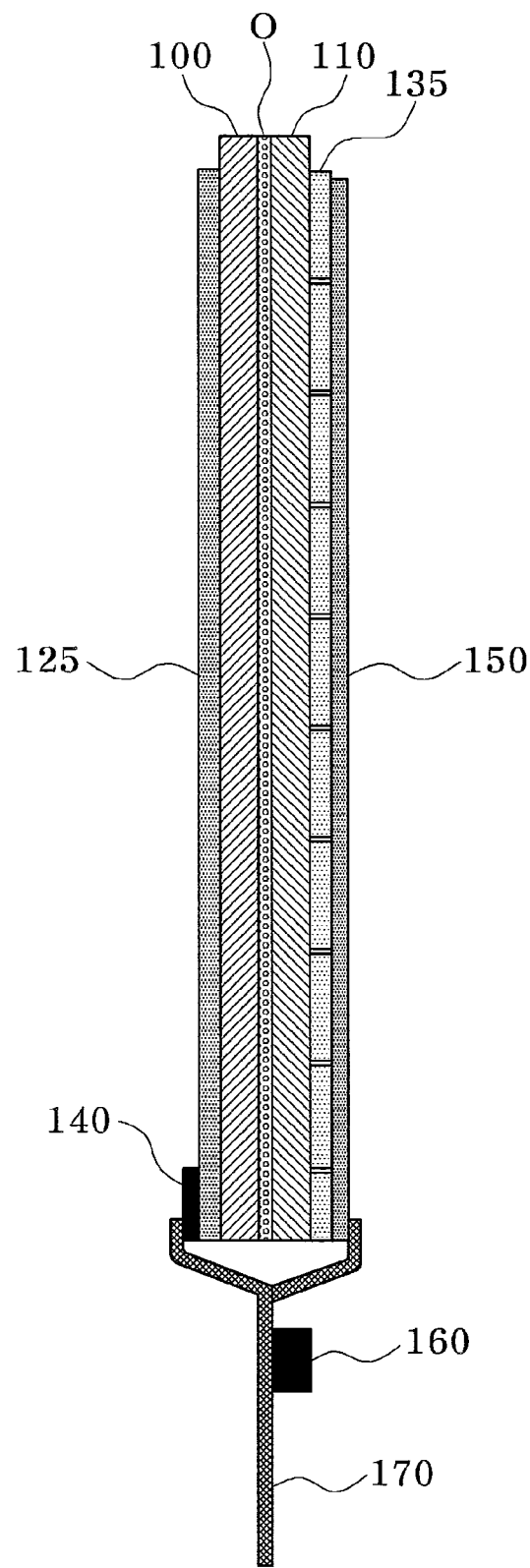
FIG. 4 is a longitudinal sectional view of a capacitive touch-screen panel according to an exemplary embodiment of the present invention.
Figure 5:
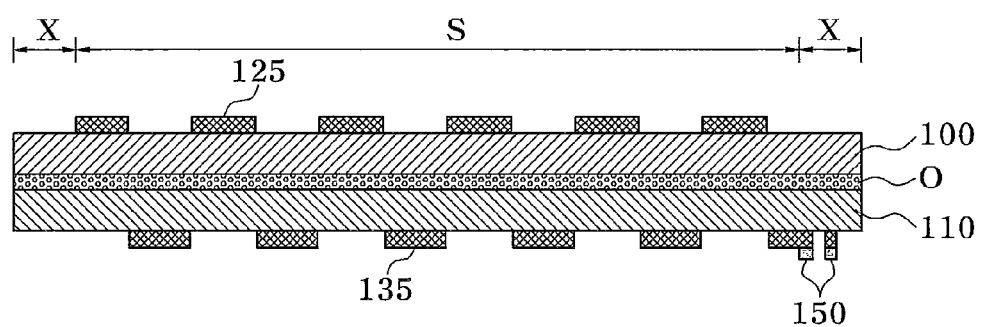
FIG. 5 is a cross-sectional view taken along line A-A' of FIG. 1.

FIG. 1 is a plan view of a capacitive touch-screen panel according to an exemplary embodiment of the present invention, FIGS. 2 and 3 are plan views of only first and second substrate portions of FIG. 1, respectively, FIG. 4 is a longitudinal sectional view of a capacitive touch-screen panel according to an exemplary embodiment of the present invention, and FIG. 5 is a cross-sectional view taken along line A-A' of FIG. 1.

Referring to FIGS. 1 through 5, a capacitive touch-screen panel according to an exemplary embodiment of the present invention may include first and second substrates 100 and 110, first and second transparent electrode pattern units 120 and 130, and first and second outer electrode interconnections 140 and 150.

First lateral surfaces of the first and second substrates 100 and 110 may be bonded to each other by an interlayer adhesive O. Each of the first lateral surfaces of the first and second substrates 100 and 110 may include a screen region S and an inactive region X.

Each of the first and second substrates 100 and 110 may be a transparent dielectric film formed of, for example, glass, polyimide (PI), acryl, polyethylene terephthalate (PET), or polyethylene naphthalate (PEN).

Also, the interlayer adhesive O may be a transparent adhesive, for example, an optically clear adhesive (OCA).

The first transparent electrode pattern unit 120 may be disposed on the screen region S of the second lateral surface of the first substrate 100 and include a plurality of first transparent electrode patterns 125, which are electrically connected in a lengthwise direction such that vertices of a plurality of triangular or rectangular sensing pads SP are spaced a predetermined distance apart from one another. The plurality of first transparent electrode patterns 125 may be spaced a predetermined distance apart from one another in a widthwise direction.

The second transparent electrode pattern unit 130 may be disposed on the screen region S of the second lateral surface of the second substrate 110 and include a plurality of second transparent electrode patterns 135, which are electrically connected in a widthwise direction such that vertices of a plurality of triangular or rectangular sensing pads SP are spaced a predetermined distance apart from one another. The plurality of second transparent electrode patterns 135 may be spaced a predetermined distance apart from one another in a lengthwise direction and disposed at right angles to one another between the respective first transparent electrode patterns 125. As a result, from the plan view, the first and second substrates 100 and 110 may form a right-angled grating shape.

Each of the first and second transparent electrode pattern units 120 and 130 may be formed of, for example, indium tin oxide (ITO), indium zinc oxide (IZO), aluminum (Al)-doped ZnO (AZO), carbon nanotubes (CNT), poly(3,4-ethylenedioxythiophene) (PEDOT), or silver (Ag) or copper (Cu) transparent ink.

Meanwhile, although the sensing pad SP may have, for example, a triangular shape, a rectangular shape, or a lozenge shape, the present invention is not limited thereto. For example, the sensing pad SP may have one of various shapes, such as a circular shape, an elliptical shape, or a polygonal shape.

The first outer electrode interconnection 140 may be disposed on the inactive region X of the second lateral surface of the first substrate 100 and electrically connected to each of the first transparent electrode patterns 125 of the first transparent electrode pattern unit 120.

The second outer electrode interconnection 150 may be disposed on the inactive region X of the second lateral surface of the second substrate 100 and electrically connected to each of the second transparent electrode patterns 135 of the second transparent electrode pattern unit 130.

In order to drive and control the entire touch-screen panel, a double-sided external driver (e.g., a flexible printed circuit (FPC) or chip on film (COF)) 170 having a controller 160 may be bonded to each of the inactive regions X of the second lateral surfaces of the first and second substrates 100 and 110 and electrically connected to the first and second outer electrode interconnections 140 and 150.

Although not shown, the capacitive touch-screen panel may further include a transparent substrate and a shielding electrode pattern configured to remove a noise signal. The transparent substrate may have a first lateral surface bonded to the second lateral surface of the second substrate 110 by an interlayer adhesive O. The transparent substrate may have a screen region S and an inactive region X. The shielding electrode pattern may be disposed on the screen region S of the second lateral surface of the transparent substrate to remove an electromagnetic interference (EMI) noise.

In addition, the capacitive touch-screen panel may further include an outer shielding electrode interconnection disposed on the inactive region X of the second lateral surface of the transparent substrate and electrically connected to the shielding electrode pattern. Meanwhile, the shielding electrode pattern may have, for example, a plate shape or a mesh shape.

Also, the positions of the transparent substrate, the shielding electrode pattern, and the outer shielding electrode interconnection may be changed. That is, each of the shielding electrode pattern and the outer shielding electrode interconnection may be formed in a predetermined region of the first lateral surface of the transparent substrate, and the first lateral surface of the transparent substrate may be bonded to the second lateral surface of the second substrate 110 by an interlayer adhesive O.

Figure 6:
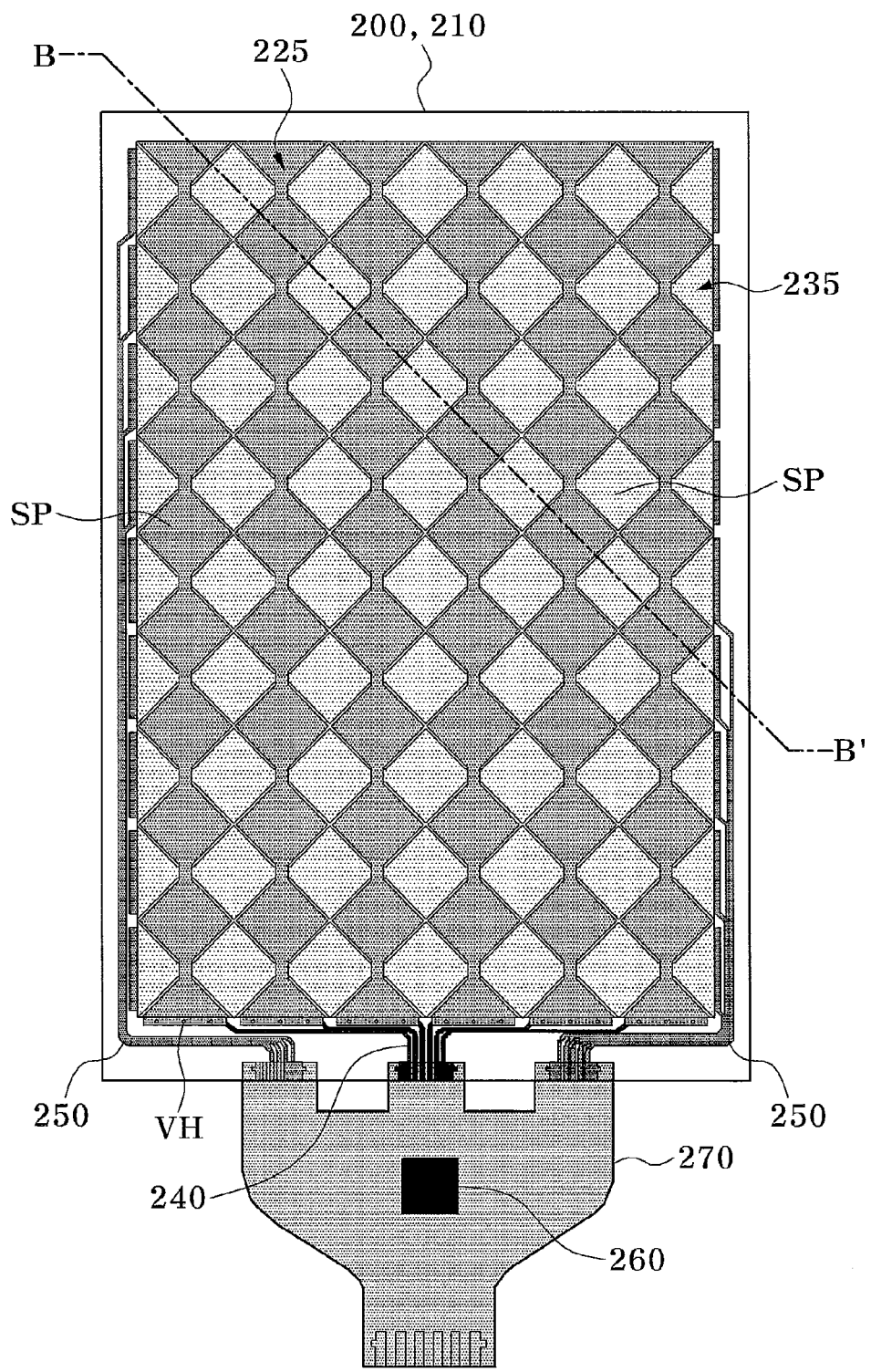
FIG. 6 is a plan view of a capacitive touch-screen panel according to another exemplary embodiment of the present invention.
Figure 7:
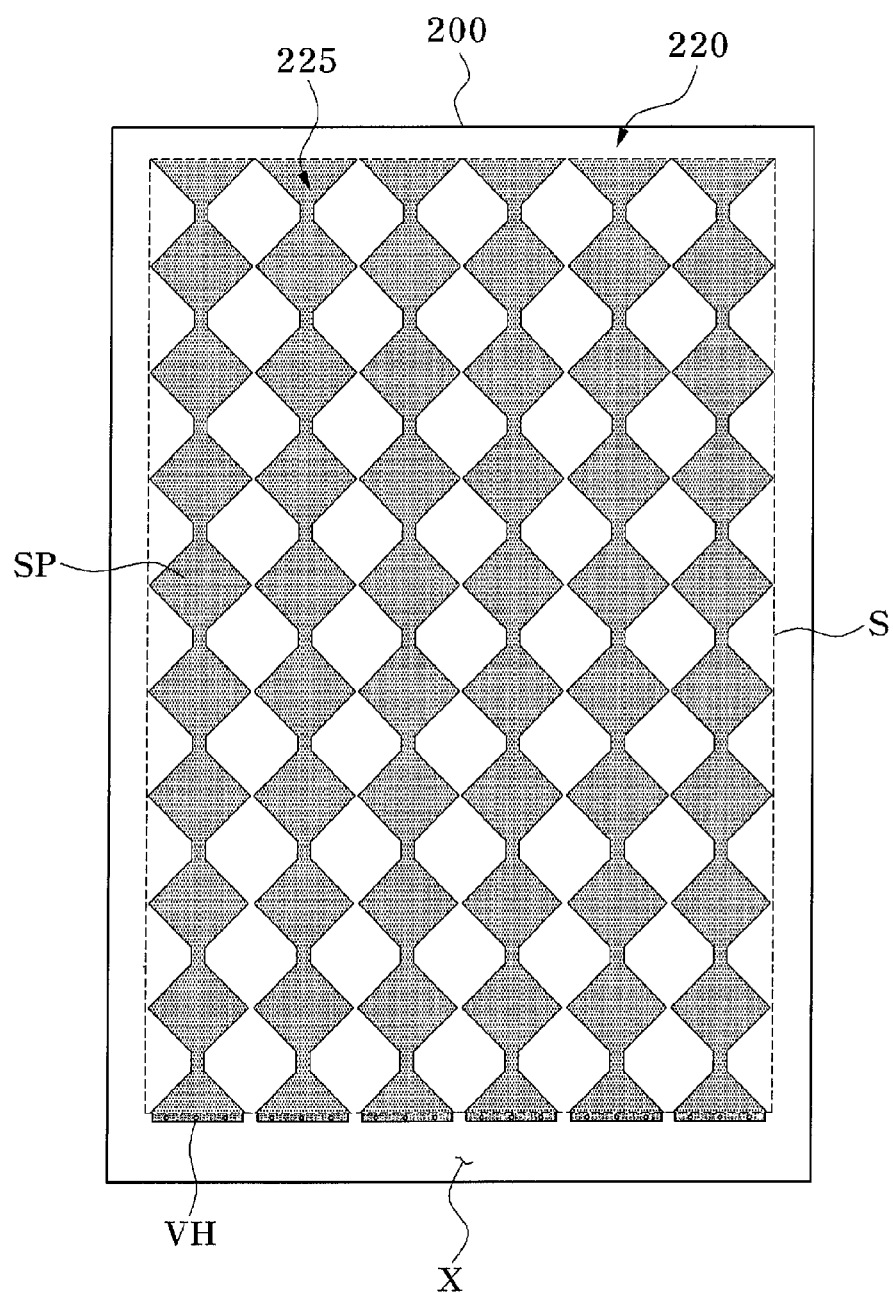
FIGS. 7 and 8 are plan views of only first and second substrate portions of FIG. 6, respectively.
Figure 8:
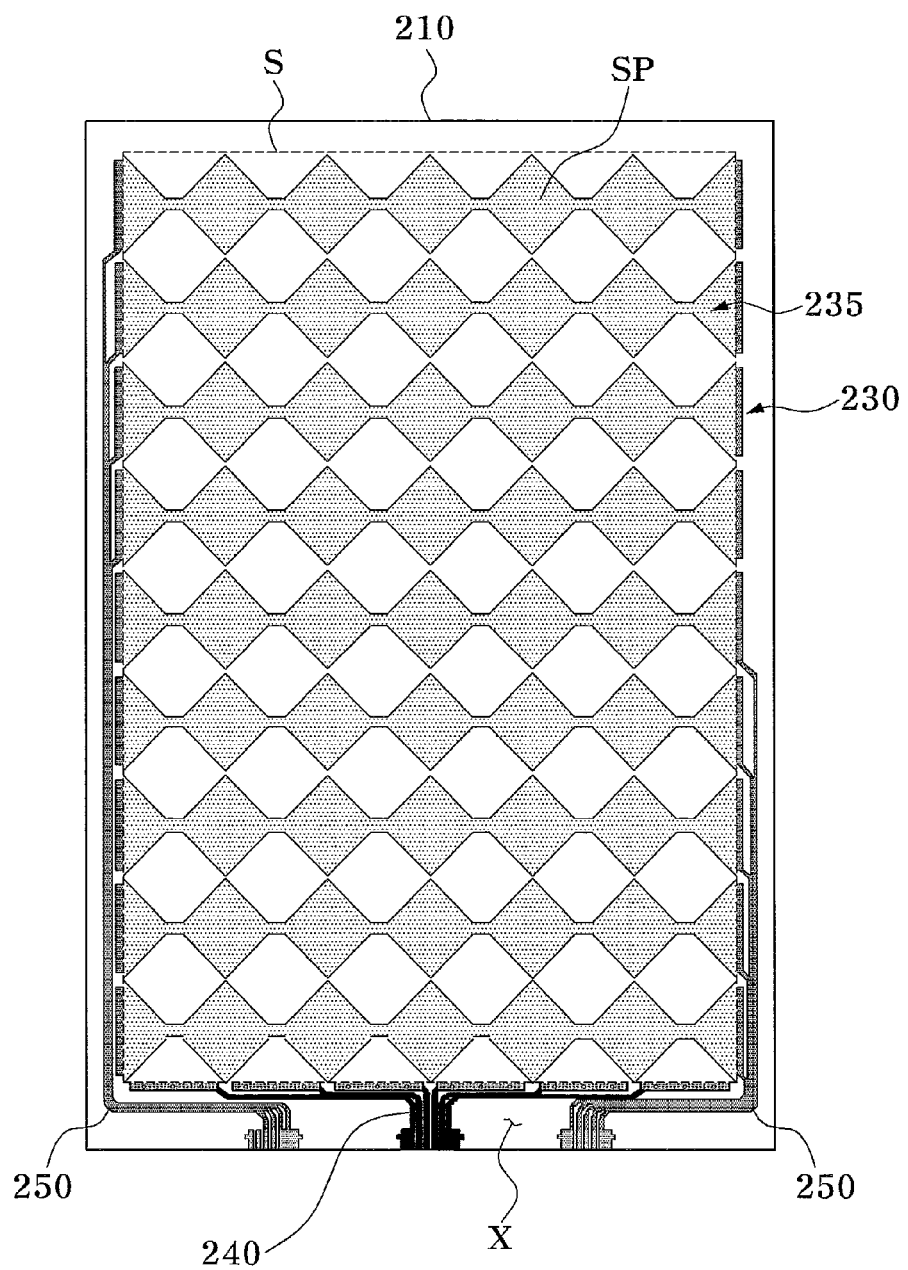
Figure 9:
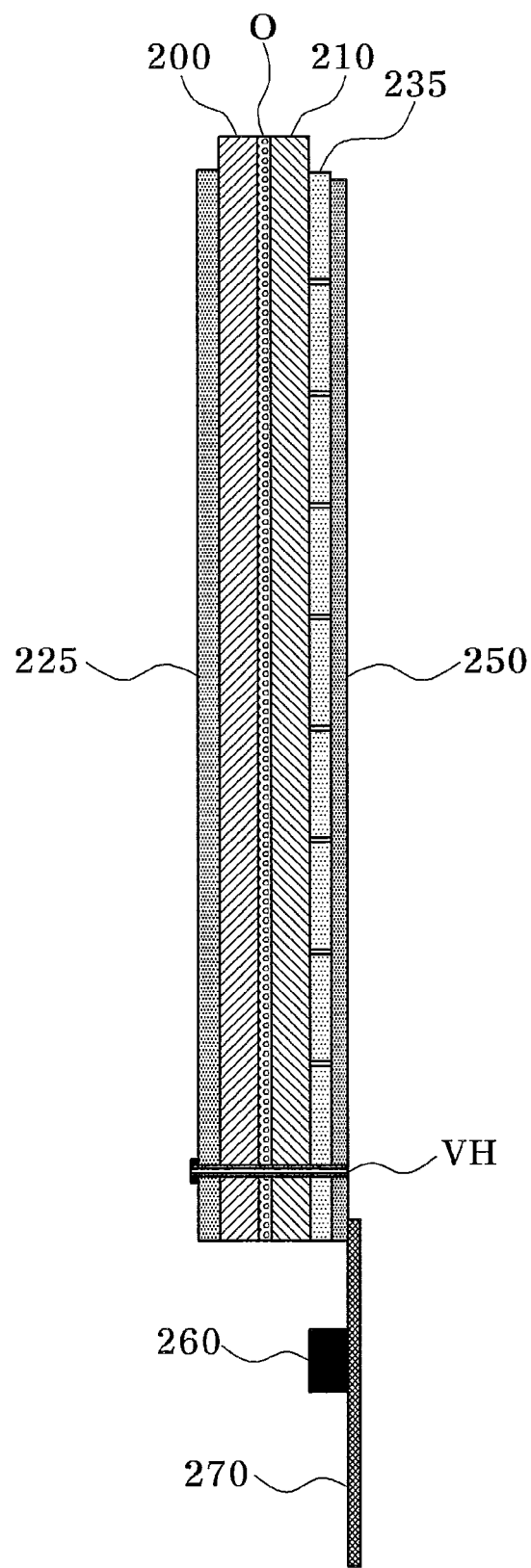
FIG. 9 is a longitudinal sectional view of a capacitive touch-screen panel according to another exemplary embodiment of the present invention.
Figure 10:
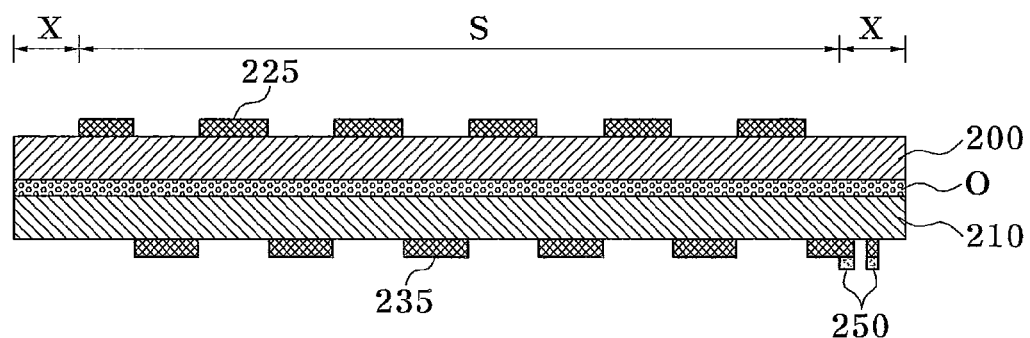
FIG. 10 is a cross-sectional view taken along line B-B' of FIG. 6.

FIG. 6 is a plan view of a capacitive touch-screen panel according to another exemplary embodiment of the present invention, FIGS. 7 and 8 are plan views of only first and second substrate portions of FIG. 6, respectively, FIG. 9 is a longitudinal sectional view of a capacitive touch-screen panel according to another exemplary embodiment of the present invention, and FIG. 10 is a cross-sectional view taken along line B-B' of FIG. 6.

Referring to FIGS. 6 through 10, the capacitive touch-screen panel according to the present invention may include first and second substrates 200 and 210, first and second transparent electrode pattern units 220 and 230, and first and second outer electrode interconnections 240 and 250.

Here, since the first and second substrates 200 and 210 and the first and second transparent electrode pattern units 220 and 230 are the same as described above with reference to FIGS. 1 through 5, a detailed description thereof will be omitted.

In particular, the capacitive touch-screen panel shown in FIGS. 6 through 10, according to the present invention, may be configured to bond a single-sided external driver 270. The first outer electrode interconnection 240 may be formed on an inactive region X of a second lateral surface of the second substrate 210 and electrically connected to each of first transparent electrode patterns 225 of the first transparent electrode pattern unit 220 through at least one via hole VH formed in the inactive regions X of the first and second substrates 200 and 210.

The second outer electrode interconnection 250 may be formed on the inactive region X of the second lateral surface of the second substrate 210 and electrically connected to each of the second transparent electrode patterns 235 of the second transparent electrode pattern unit 230.

In general, to drive and control the touch-screen panel, a single-sided external driver 270 having a controller 260 may be bonded to the inactive regions X of the second lateral surfaces of the first and second substrates 200 and 210 and electrically connected to each of the first and second outer electrode interconnections 240 and 250.

Meanwhile, although FIG. 6 illustrates that the external driver 270 having the controller 260 is bonded to protrude outward, the present invention is not limited thereto. For example, the single-sided external driver 270 may not protrude outward but be bonded to upper portions of the inactive regions of the inactive regions X of the second lateral surfaces of the first and second substrates 200 and 210.

Furthermore, although not shown, the capacitive touch-screen panel may further include a transparent substrate and a shielding electrode pattern configured to remove a noise signal. The transparent substrate may have a first lateral surface bonded to the second lateral surface of the second substrate 210 by an interlayer adhesive O. The transparent substrate may have a screen region S and an inactive region X. The shielding electrode pattern may be disposed on the screen region S of a second lateral surface of the transparent substrate.

In addition, the capacitive touch-screen panel may further include an outer shielding electrode interconnection formed on the inactive region X of the second lateral surface of the transparent substrate and electrically connected to the shielding electrode pattern. Meanwhile, the shielding electrode pattern may have, for example, a plate or mesh shape.

Also, the positions of the transparent substrate, the shielding electrode pattern, and the outer shielding electrode interconnection may be changed. That is, each of the shielding electrode pattern and the outer shielding electrode interconnection may be formed in a predetermined shape in a predetermined region of a first lateral surface of the transparent substrate, and a first lateral surface of the transparent substrate may be bonded to the second lateral surface of the second substrate 210 by an interlayer adhesive O.

Although it is described above that the first and second substrates 100 and 110 (or 200 and 210) are bonded to each other by an interlayer adhesive O, the present invention is not limited thereto. For example, a single substrate may be adopted without using the interlayer adhesive O.

Embodiment 1

FIGS. 11 through 16 are plan and cross-sectional views illustrating a method of fabricating a capacitive touch-screen panel according to a first exemplary embodiment of the present invention.

Figure 11:
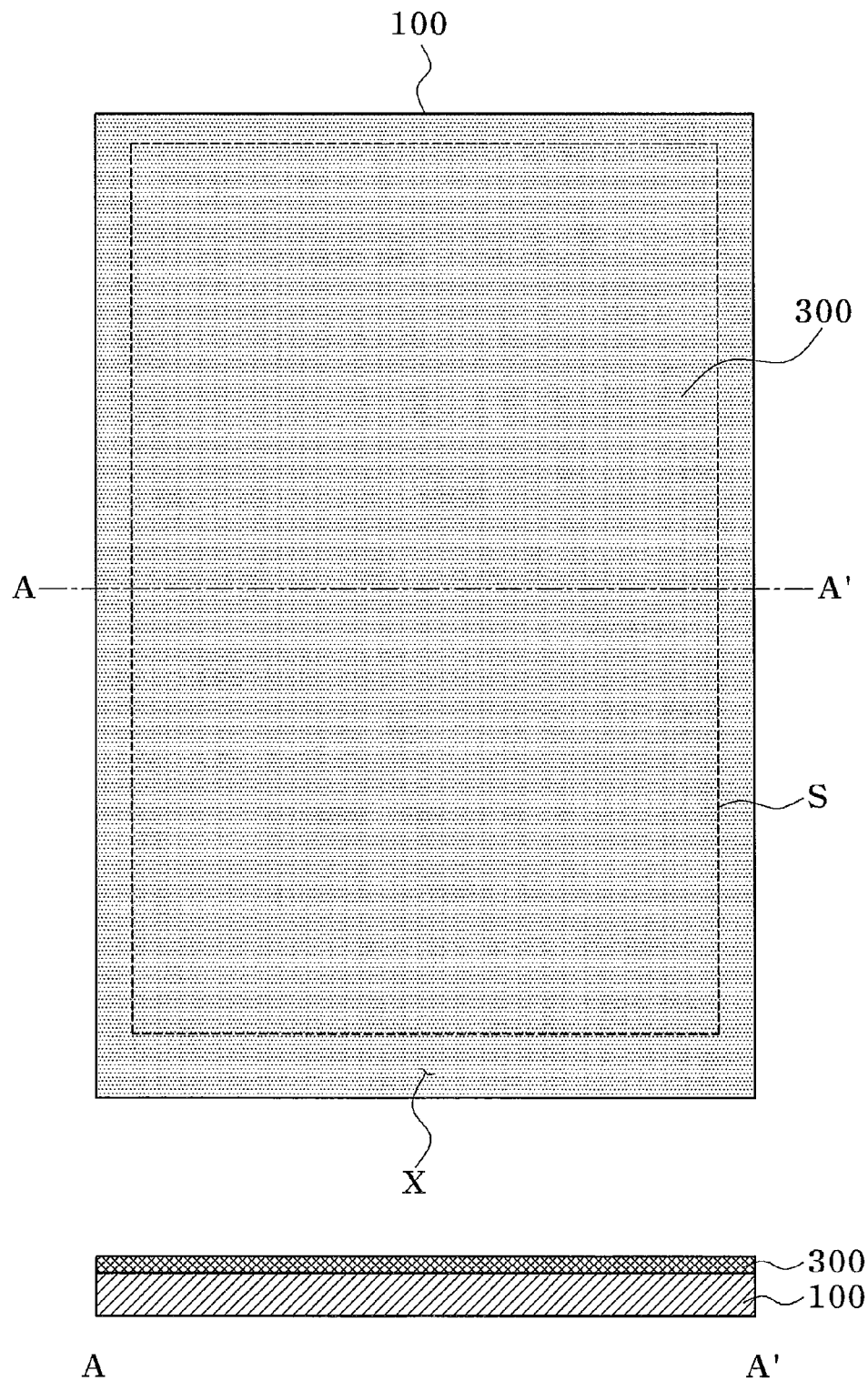
Figure 12:
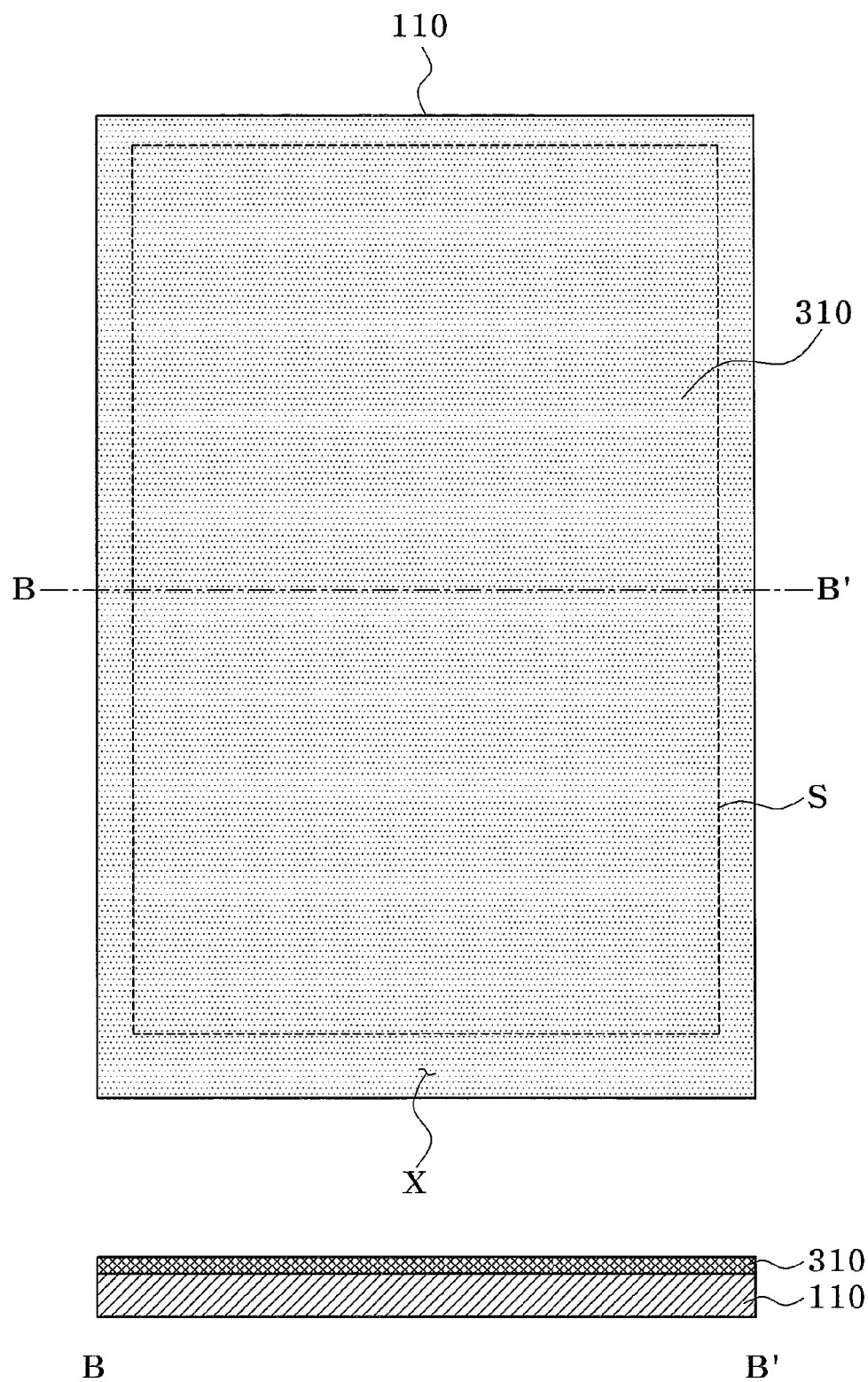

Referring to FIGS. 11 through 13, first and second substrates 100 and 110 may be prepared. Each of the first and second substrates 100 and 110 may have a screen region S and an inactive region X. First and second transparent conductive layers 300 and 310 for forming first and second transparent electrode pattern units may be formed to a predetermined thickness on first lateral surfaces of the first and second substrates 100 and 110, respectively. Second lateral surfaces of the first and second substrates 100 and 110 may be bonded to each other using an interlayer adhesive O.

Figure 14:
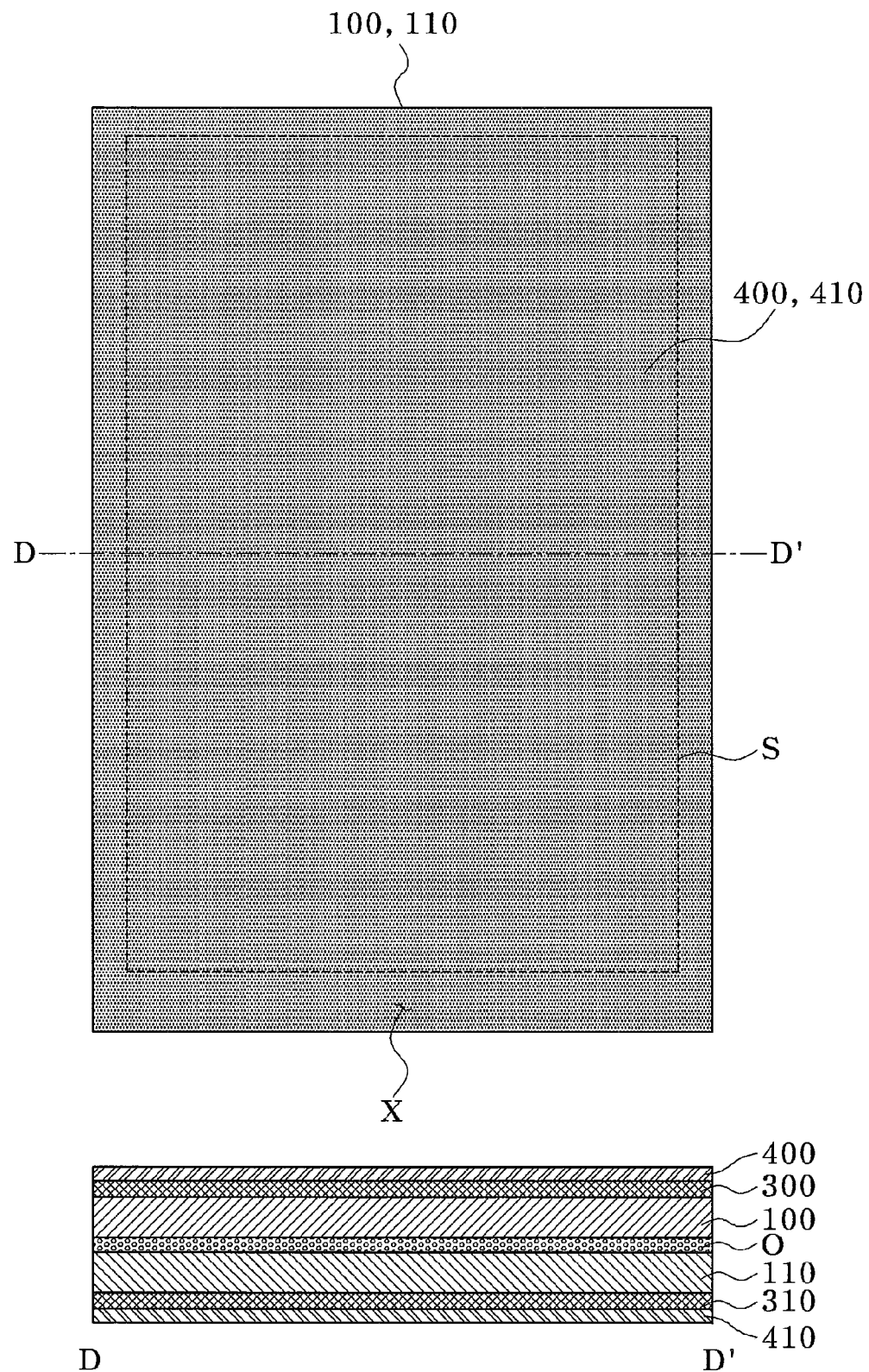

Referring to FIG. 14, first and second metal layers 400 and 410 for forming first and second outer electrode interconnections may be deposited to a predetermined thickness on the exposed surfaces of the first and second transparent conductive layers 300 and 310, respectively, using a typical sputtering or printing process.

In this case, the first and second metal layers 400 and 410 may be formed of, for example, at least one highly conductive material selected from the group consisting of copper (Cu), nickel (Ni), aluminum (Al), chromium (Cr), molybdenum (Mo), silver (Ag), and gold (Au) using a sputtering process, a direct printing process, a coating process, or a dry or wet plating process. The sputtering process may be a physical vapor deposition (PVD) process, a chemical vapor deposition (CVD) process, or a plasma enhanced chemical vapor deposition (PECVD) process. The direct printing process may be a screen printing process, a Gravure process, a Gravure offset process, or an inkjet process.

Meanwhile, although the first exemplary embodiment describes that after the second lateral surfaces of the first and second substrates 100 and 110 are bonded to each other, the first and second metal layers 400 and 410 are deposited on the exposed surfaces of the first and second transparent conductive layers 300 and 310, respectively, the present invention is not limited thereto. For example, the second lateral surfaces of the first and second substrates 100 and 110 may be bonded to each other after the first and second metal layers 400 and 410 are deposited on the exposed surfaces of the first and second transparent conductive layers 300 and 310, respectively.

Referring to FIG. 15, the first metal layer 400 and the first transparent conductive layer 300 may be sequentially blanket-etched using an ordinary photolithography process, and the second metal layer 410 and the second transparent conductive layer 310 may be sequentially blanket-etched using an ordinary photolithography process to expose predetermined portions of the screen region S and the inactive region X of the first lateral surfaces of the first and second substrates 100 and 110.

In this case, the photolithography process may be a process of forming the same pattern as a pattern of a mask by selectively irradiating light to photoresist (PR) using a mask of a desired pattern on the principle that when a predetermined chemical, for example, PR, is irradiated with light, a chemical reaction is caused to change the properties of the PR.

The photolithography process may include a PR coating process of coating PR corresponding to film of ordinary photographs, an exposure process of selectively irradiating light using a mask, and a developing process of removing the PR from an exposed portion using a developing solution to form a desired pattern.

Referring to FIG. 16, the first and second metal layers 400 and 410 may be selectively etched to expose the first and second transparent conductive layers 300 and 310 on the screen regions S of the first and second substrates 100 and 110. Thus, as shown in FIGS. 1 through 4, double-side exposure and etching processes may be performed so that a first transparent electrode pattern unit 220 and a first outer electrode interconnection 240 electrically connected to the first transparent electrode pattern unit 220 may be respectively formed on the screen region S and the inactive region X of the first lateral surface of the first substrate 100 and simultaneously, a second transparent electrode pattern unit 230 and a second outer electrode interconnection 250 electrically connected to the second transparent electrode pattern unit 230 may be respectively formed on the screen region S and the inactive region X of the first lateral surface of the second substrate 110.

Embodiment 2

FIGS. 17 through 21 are plan and cross-sectional views illustrating a method of fabricating a capacitive touch-screen panel according to a second exemplary embodiment of the present invention.

Figure 17:
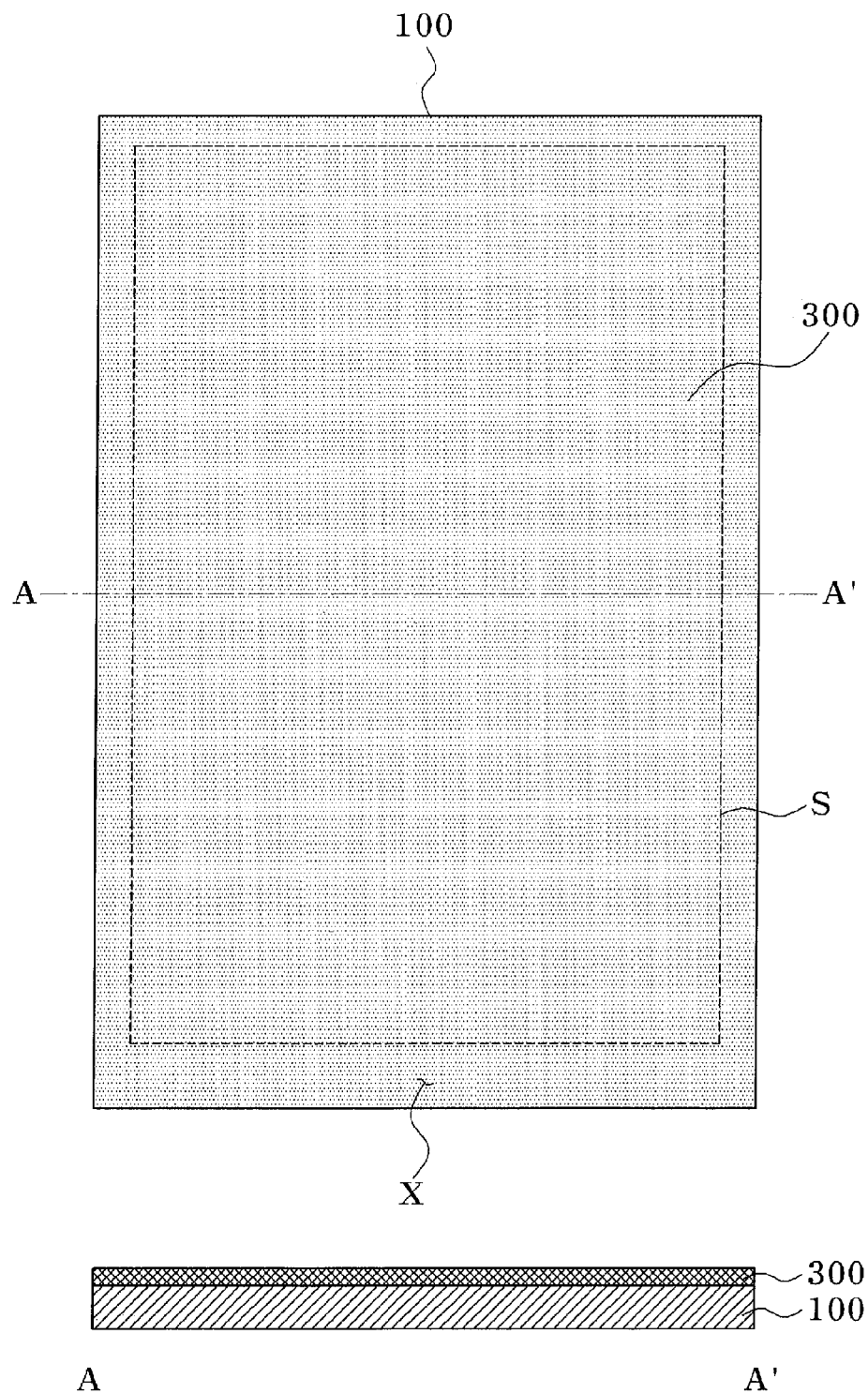
Figure 18:
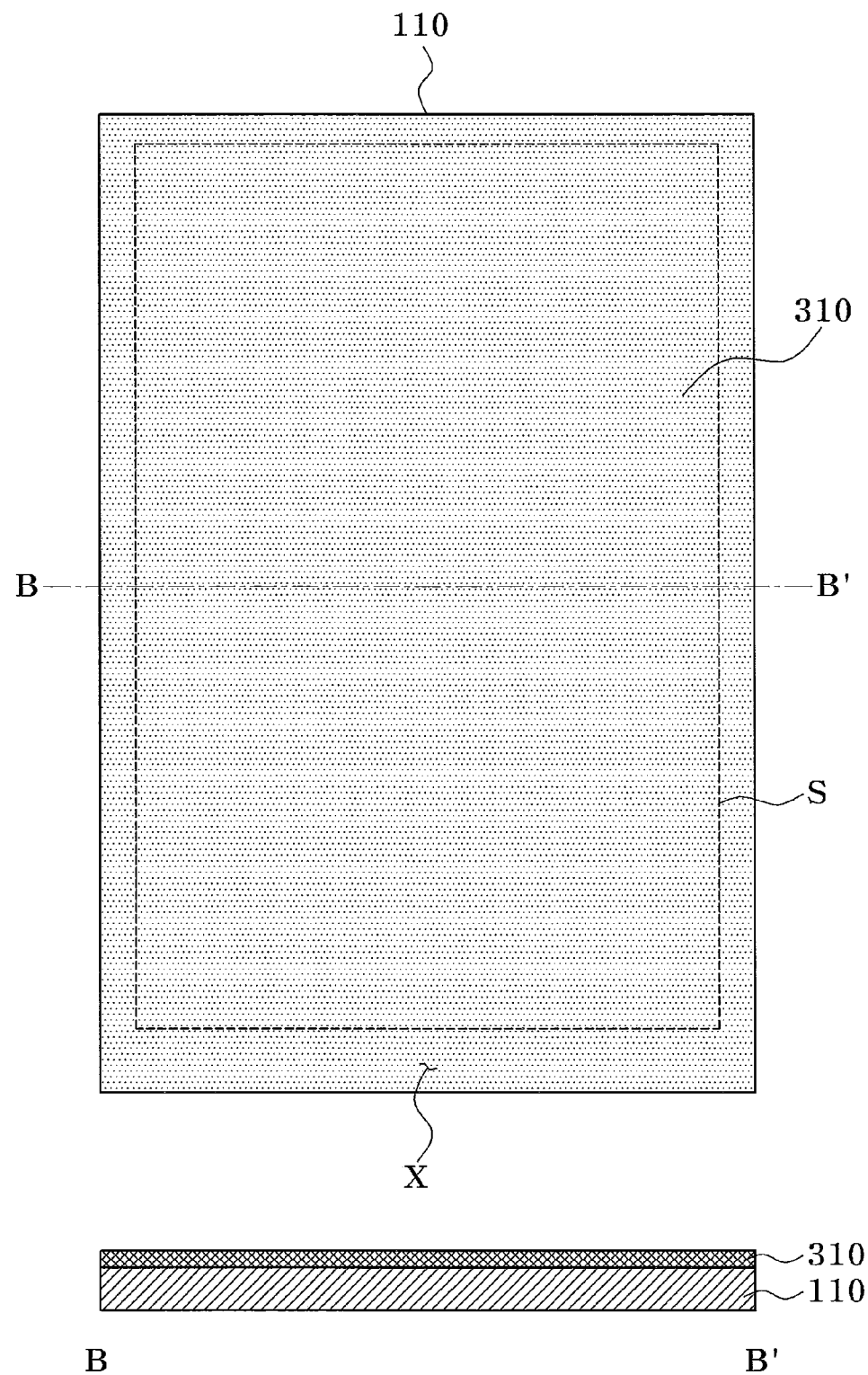

Referring to FIGS. 17 through 19, first and second substrates 100 and 110 may be prepared. Each of the first and second substrates 100 and 110 may include a screen region S and an inactive region X. First and second transparent conductive layers 300 and 310 for forming first and second transparent electrode pattern units may be formed to a predetermined thickness on first lateral surfaces of the first and second substrates 100 and 110. Second lateral surfaces of the first and second substrates 100 and 110 may be bonded to each other using an interlayer adhesive O.

Figure 20:
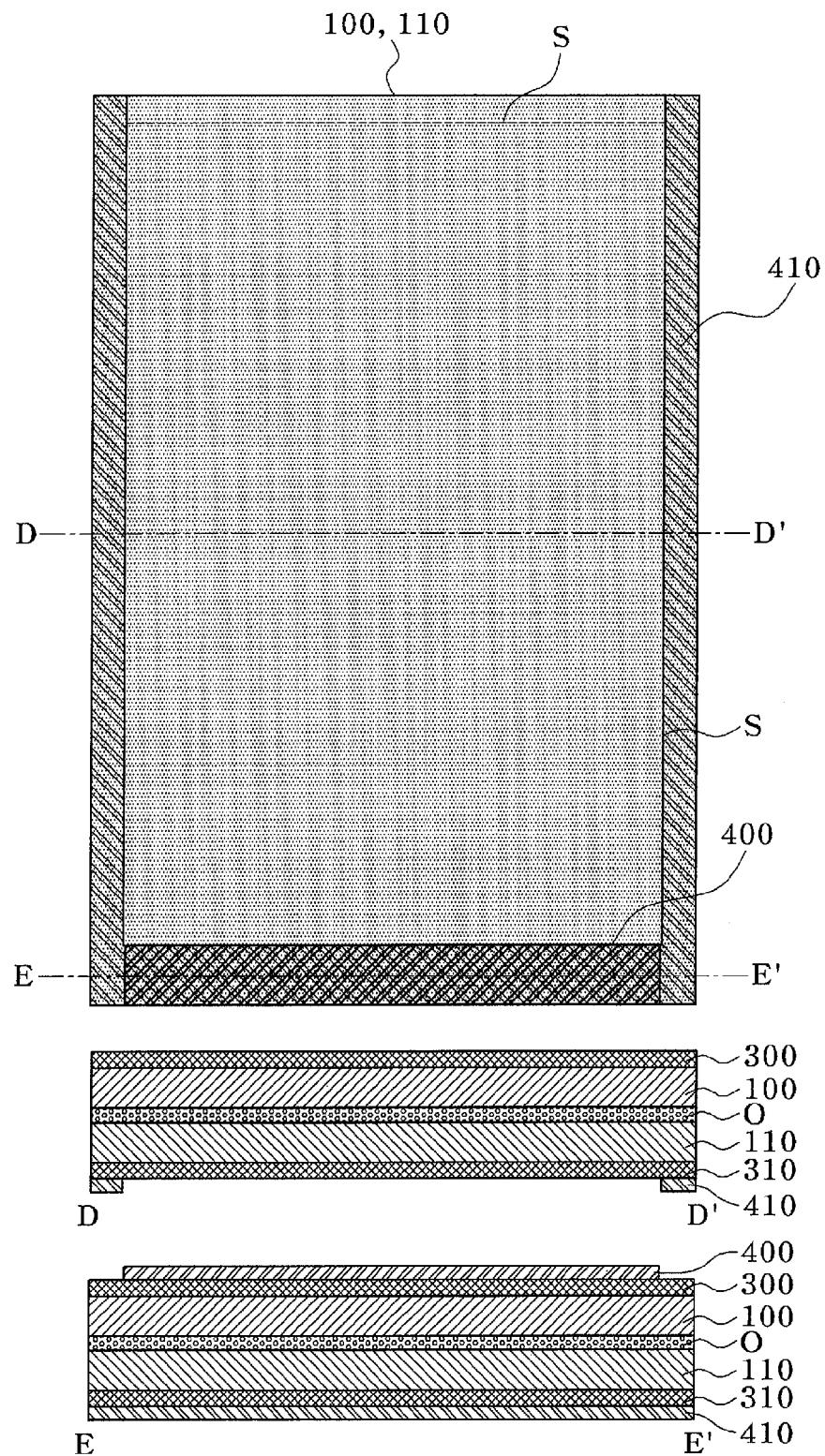
Figure 22:
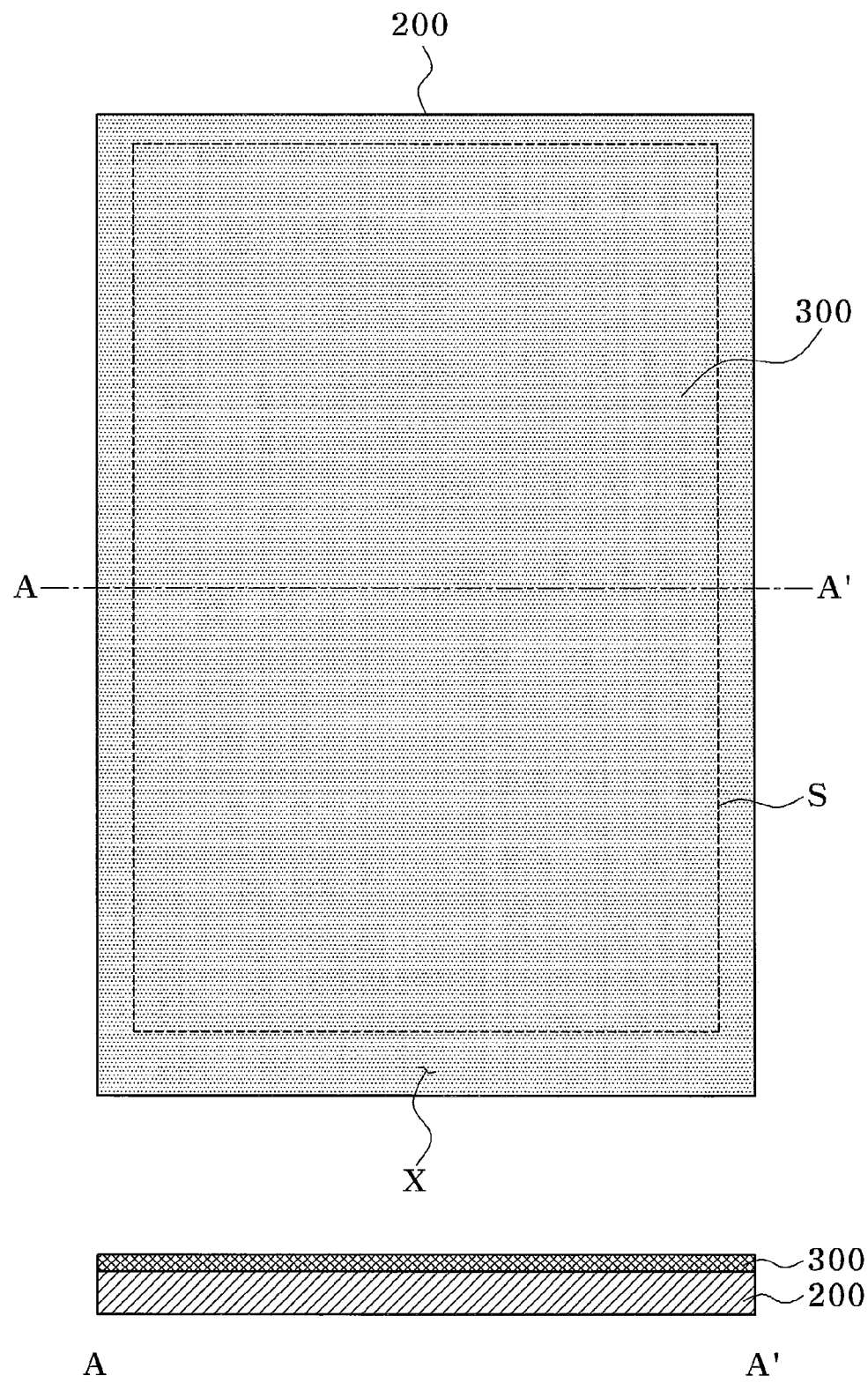

Referring to FIG. 20, first and second metal layers 400 and 410 for forming first and second outer electrode interconnections may be selectively deposited to predetermined thicknesses on predetermined exposed surfaces of the first and second transparent conductive layers 300 and 310 formed on the inactive regions X of the first and second substrates 100 and 110 by means of an ordinary sputtering or printing process using first and second masks 500 and 510 for forming first and second outer electrode interconnections.

Meanwhile, although the second exemplary embodiment describes that after the second lateral surfaces of the first and second substrates 100 and 110 are bonded to each other, the first and second metal layers 400 and 410 are selectively deposited on the exposed surfaces of the first and second transparent conductive layers 300 and 310, respectively, the present invention is not limited thereto. For example, the second lateral surfaces of the first and second substrates 100 and 110 may be bonded to each other after the first and second metal layers 400 and 410 are selectively deposited on the exposed surfaces of the first and second transparent conductive layers 300 and 310, respectively.

Referring to FIG. 21, the first and second transparent conductive layers 300 and 310 and the first and second metal layers 400 and 410 may be blanket-etched using a typical photolithography process at the same time to expose predetermined portions of the screen region S and the inactive region X of the first lateral surfaces of the first and second substrates 100 and 110. Thus, as shown in FIGS. 1 through 4, double-side exposure and etching processes may be performed so that a first transparent electrode pattern unit 220 and a first outer electrode interconnection 240 electrically connected to the first transparent electrode pattern unit 220 may be respectively formed on the screen region S and the inactive region X of the first lateral surface of the first substrate 100 and simultaneously, a second transparent electrode pattern unit 230 and a second outer electrode interconnection 250 electrically connected to the second transparent electrode pattern unit 230 may be respectively formed on the screen region S and the inactive region X of the first lateral surface of the second substrate 110.

Embodiment 3

FIGS. 23 through 27 are plan and cross-sectional views illustrating a method of fabricating a capacitive touch-screen panel according to a third exemplary embodiment of the present invention.

Figure 23:
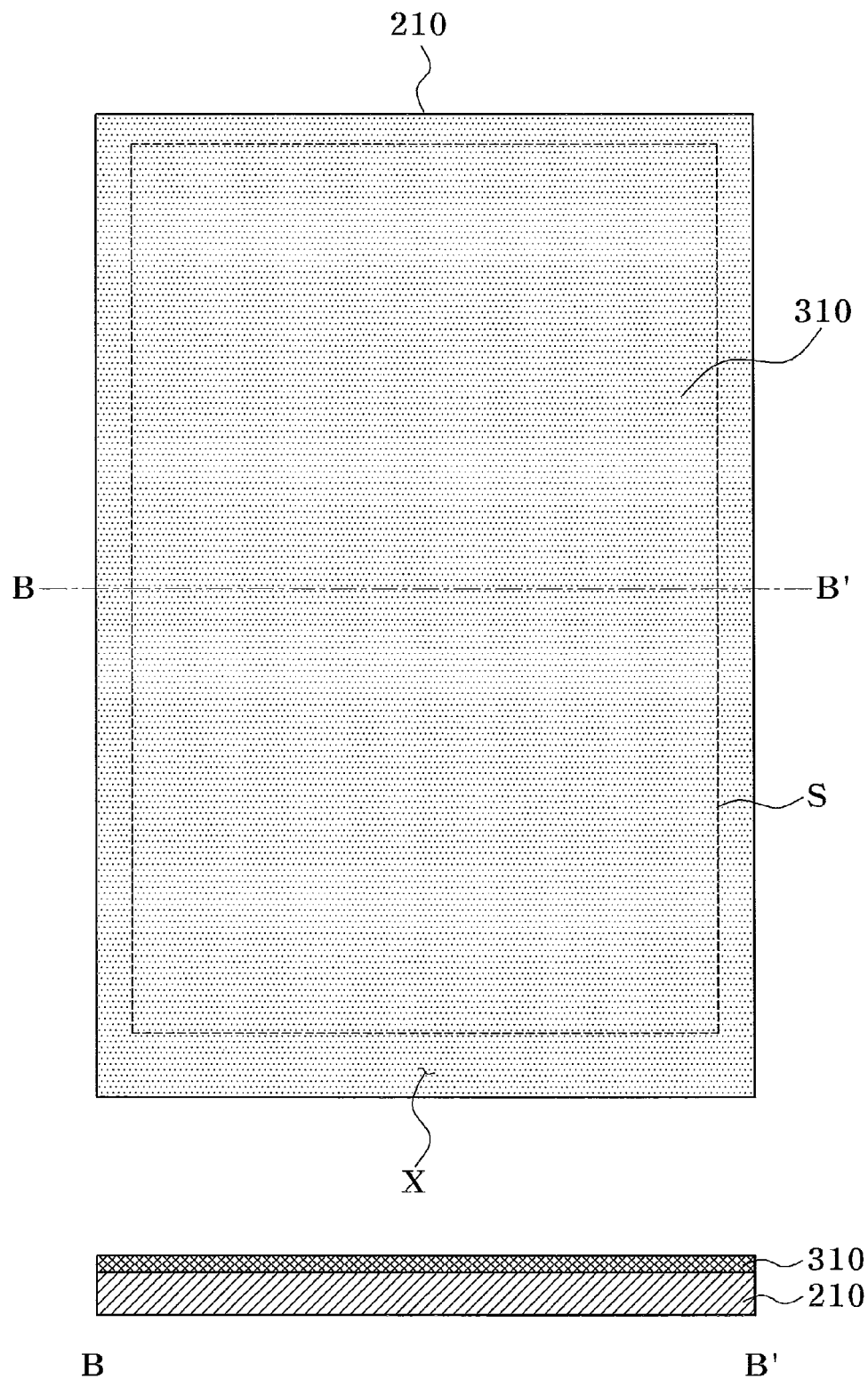
Figure 24:
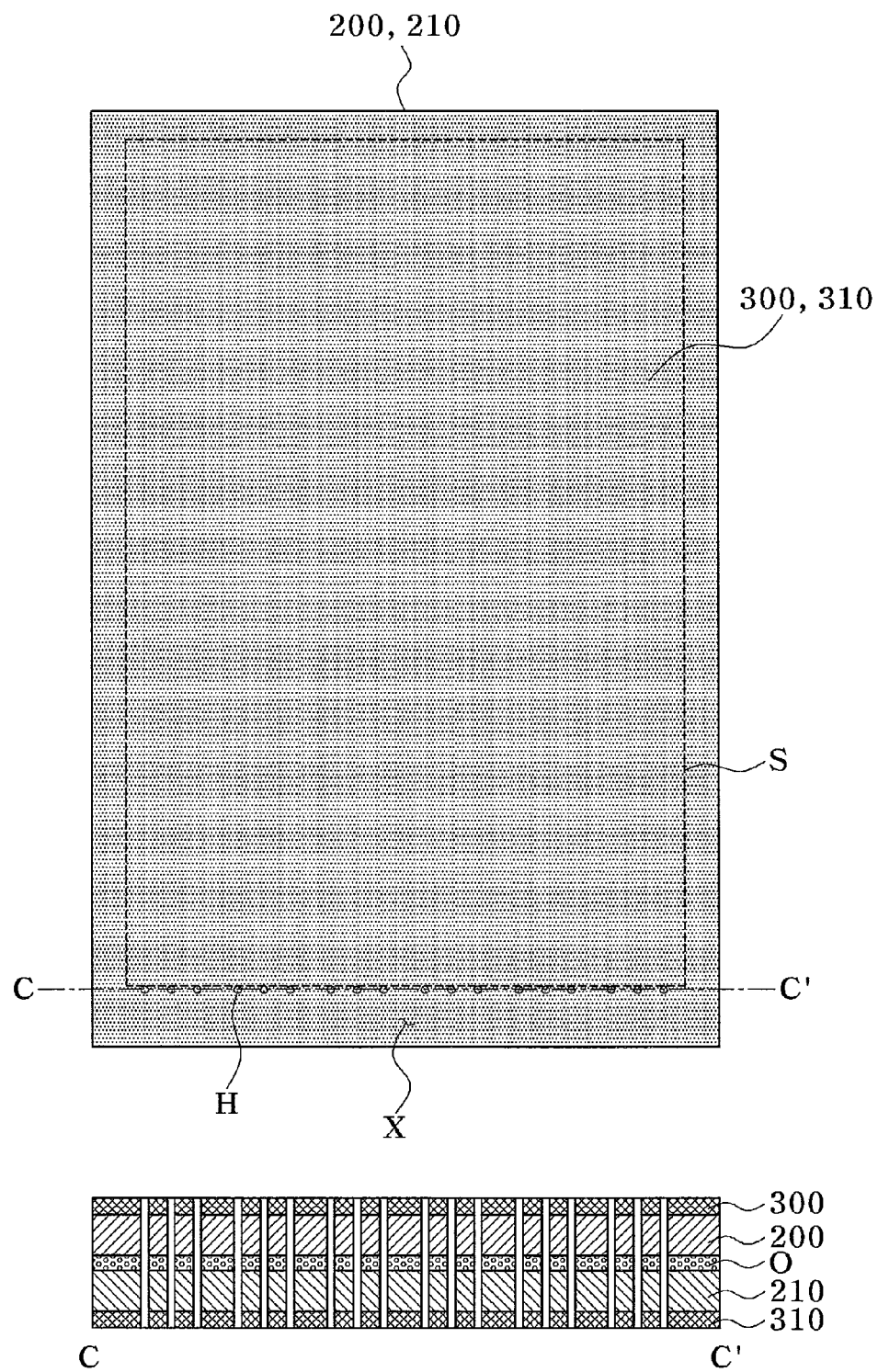

Referring to FIGS. 23 and 24, first and second substrates 200 and 210 may be prepared. Each of the first and second substrates 200 and 210 may include a screen region S and an inactive region X. First and second transparent conductive layers 300 and 310 for forming first and second transparent electrode pattern units may be formed to a predetermined thickness on the first and second substrates 200 and 210, respectively.

Second lateral surfaces of the first and second substrates 200 and 210 may be bonded to one another by an interlayer adhesive O.

Next, as shown in FIG. 24, at least one through hole H for forming at least one via hole VH may be formed using an ordinary punching apparatus in the inactive regions X of the first and second substrates 200 and 210 to penetrate the first and second transparent conductive layers 300 and 310.

Figure 25:
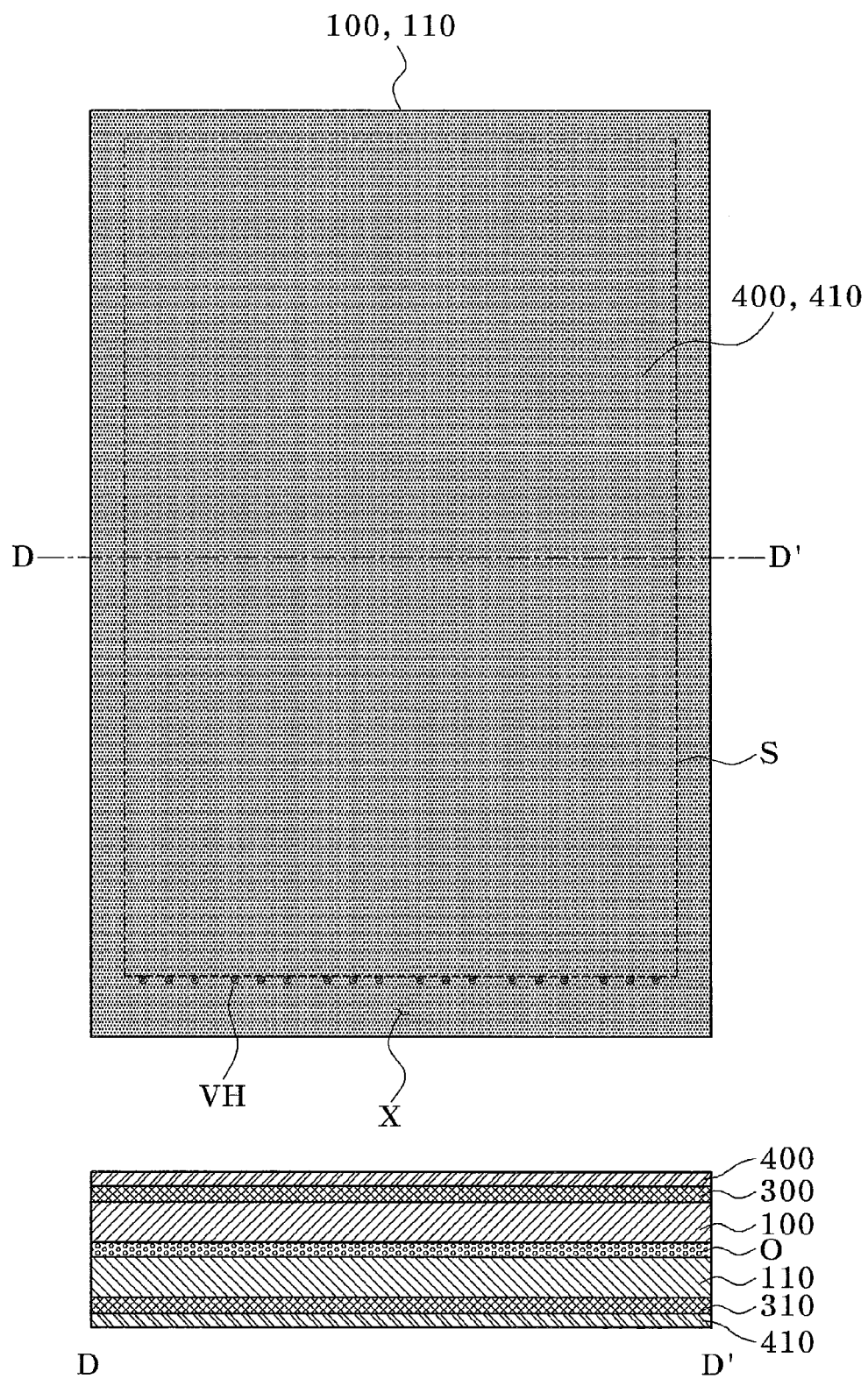

Referring to FIG. 25, first and second metal layers 400 and 410 may be deposited to a predetermined thickness on exposed surfaces of the first and second transparent conductive layers 300 and 310 including inner lateral surfaces of the respective through holes H using a typical sputtering or printing process.

In this case, the first and second metal layers 400 and 410 may be formed of, for example, at least one highly conductive material selected from the group consisting of copper (Cu), nickel (Ni), aluminum (Al), chromium (Cr), molybdenum (Mo), silver (Ag), and gold (Au) using a sputtering process, a direct printing process, a coating process, or a dry or wet plating process. The sputtering process may be a physical vapor deposition (PVD) process, a chemical vapor deposition (CVD) process, or a plasma enhanced chemical vapor deposition (PECVD) process. The direct printing process may be a screen printing process, a Gravure process, a Gravure offset process, or an inkjet process.

Meanwhile, the via hole VH (i.e., a plated through hole (PTH)) for forming an electrical conduction path between both surfaces of each of the first and second substrates 200 and 210 may be fowled using, for example, a dry or wet plating process or a dry and then wet plating process.

Referring to FIG. 26, the first metal layer 400 and the first transparent conductive layer 300 may be sequentially blanket-etched using a typical photolithography process, and the second metal layer 410 and the second transparent conductive layer 310 may be sequentially blanket-etched to expose predetermined portions of the screen region S and the inactive region X of the first lateral surfaces of the first and second substrates 200 and 210, respectively.

Referring to FIG. 27, the first and second metal layers 400 and 410 may be selectively etched to expose the first and second transparent conductive layers 300 and 310 formed on the screen regions S of the first and second substrates 200 and 210. Thus, as shown in FIGS. 6 through 10, by performing double-side exposure and etching processes, a first transparent electrode pattern unit 220 may be formed on the screen region S of the first lateral surface of the first substrate 200 and simultaneously, a second transparent electrode pattern unit 230 may be formed on the screen region S of the first lateral surface of the second substrate 210. Also, by way of each of the via holes VH formed in the inactive region X of the first lateral surface of the second substrate 210, a first outer electrode interconnection 240 may be formed to be electrically connected to each of first transparent electrode patterns 225 of the first transparent electrode pattern unit 220 and simultaneously, a second outer electrode interconnection 250 may be formed to be electrically connected to each of second transparent electrode patterns 235 of the second transparent unit 230.

Embodiment 4

FIGS. 28 through 32 are plan and cross-sectional views illustrating a method of fabricating a capacitive touch-screen panel according to a fourth exemplary embodiment of the present invention.

Figure 28:
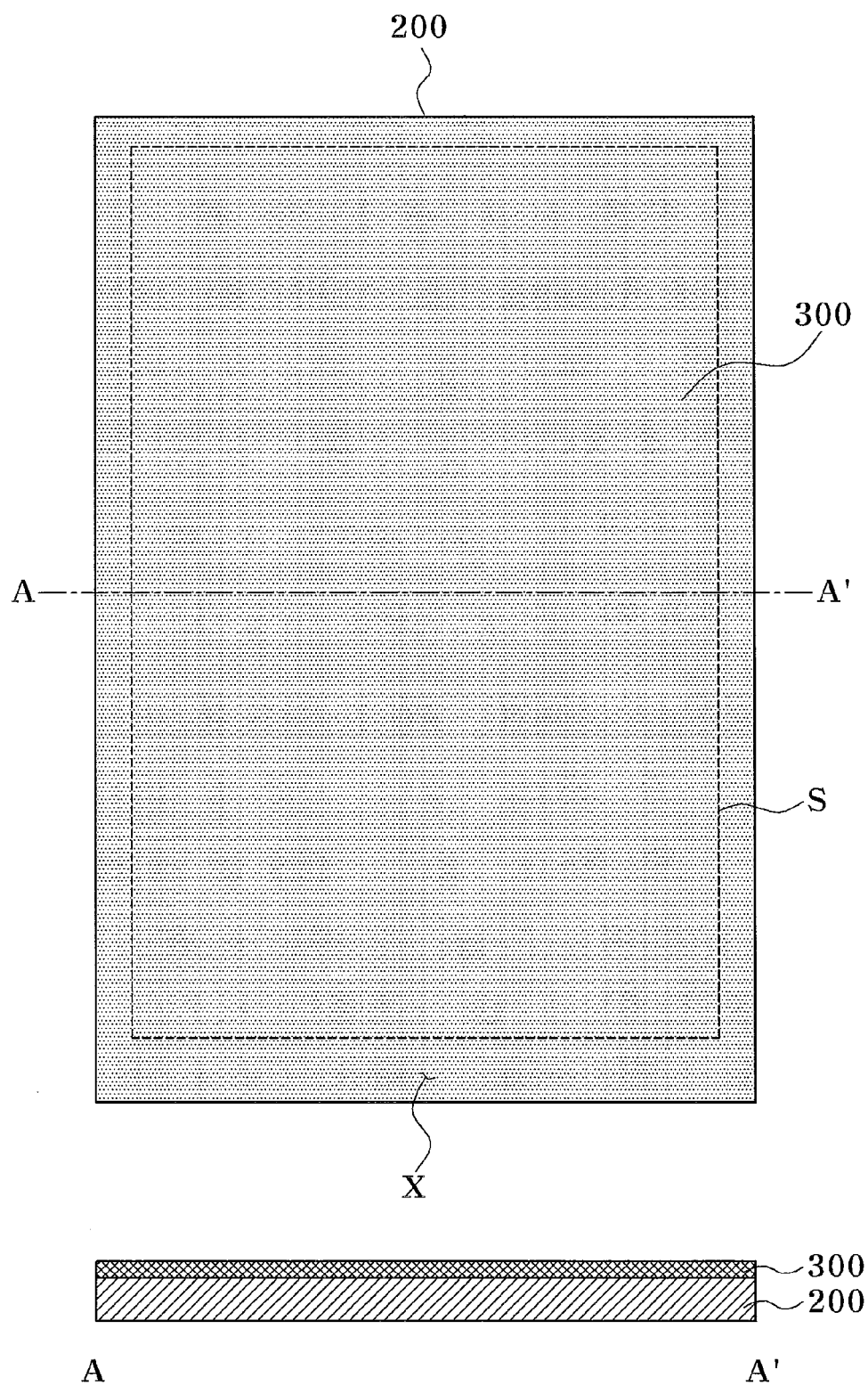
Figure 29:
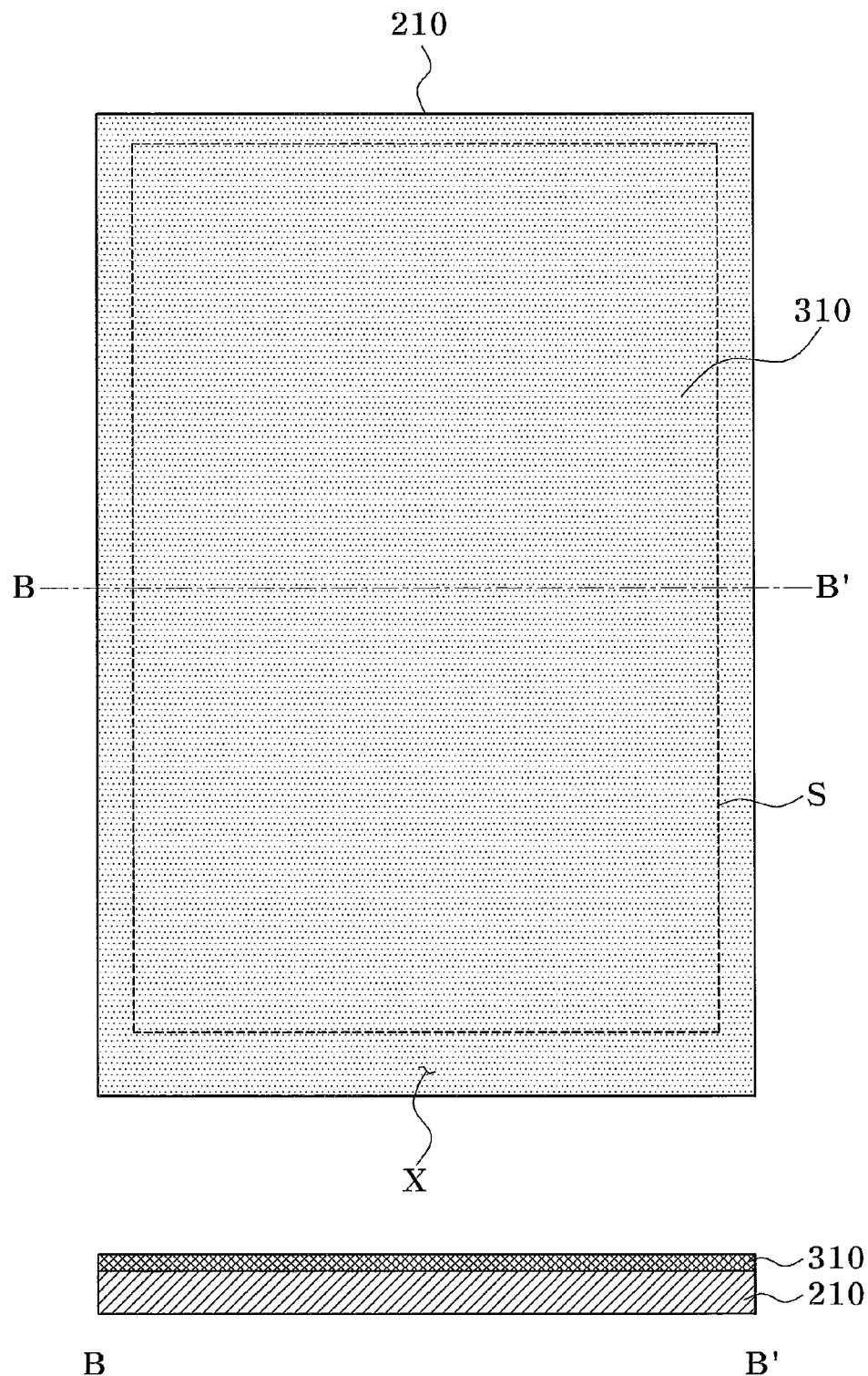

Referring to FIGS. 28 through 30, first and second substrates 200 and 210 may be prepared. First and second transparent conductive layers 300 and 310 for forming first and second transparent electrode pattern units may be formed to a predetermined thickness on first lateral surfaces of the first and second substrates 200 and 210, respectively. Second lateral surfaces of the first and second substrates 200 and 210 may be bonded to each other using an interlayer adhesive O.

Thereafter, as shown in FIG. 30, at least one through hole H for forming at least one via hole VH may be formed using an ordinary punching apparatus in the inactive regions X of the first and second substrates 200 and 210 to penetrate the first and second transparent conductive layers 300 and 310.

Figure 31:
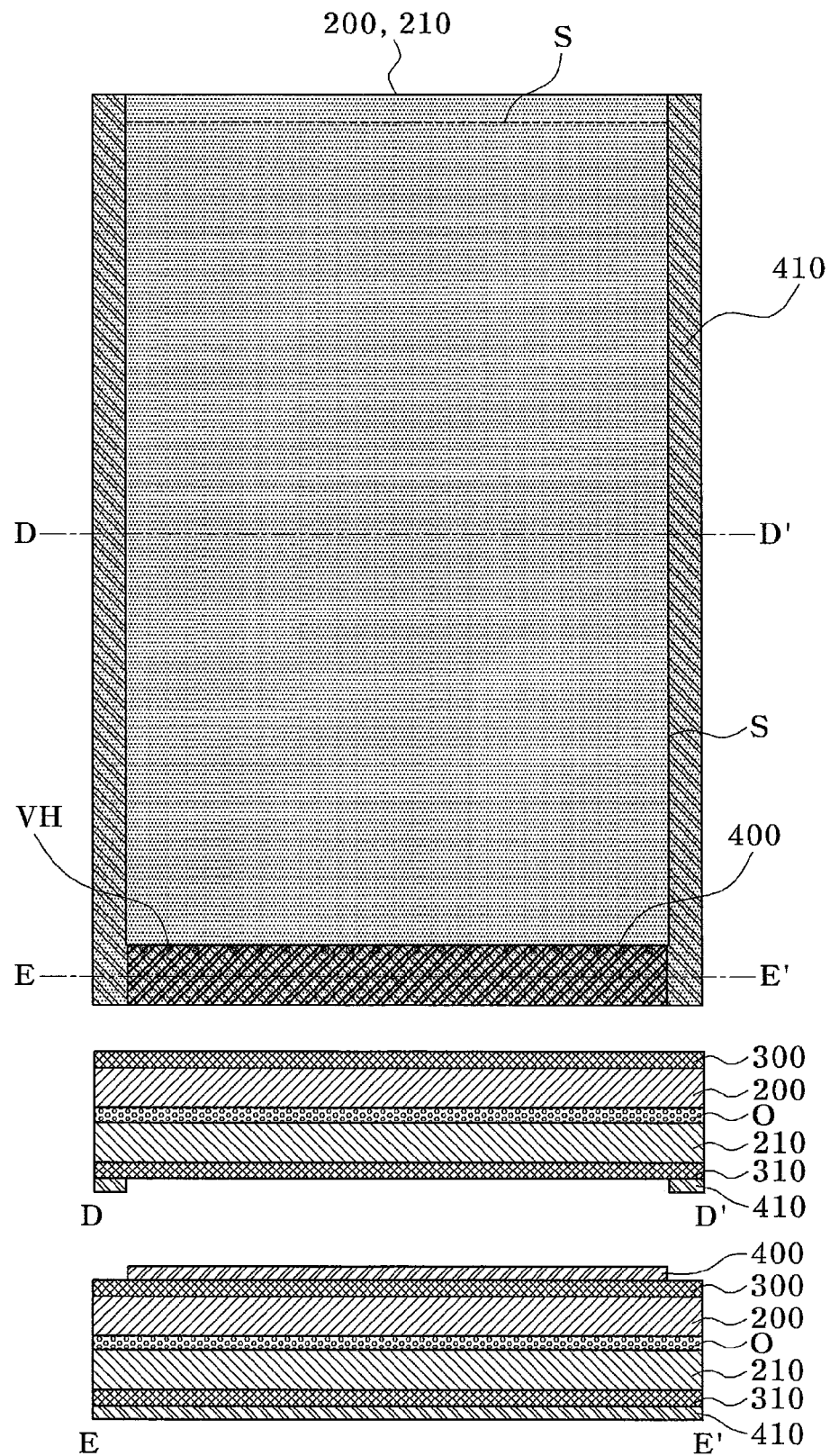

Referring to FIG. 31, first and second metal layers 400 and 410 may be selectively deposited to predetermined thicknesses on predetermined exposed surfaces of the first and second transparent conductive layers 300 and 310 including inner lateral surfaces of the respective through holes H formed on the inactive regions X of the first and second substrates 200 and 210 by means of an ordinary sputtering or printing process using predetermined first and second masks 500 and 510.

Figure 32:
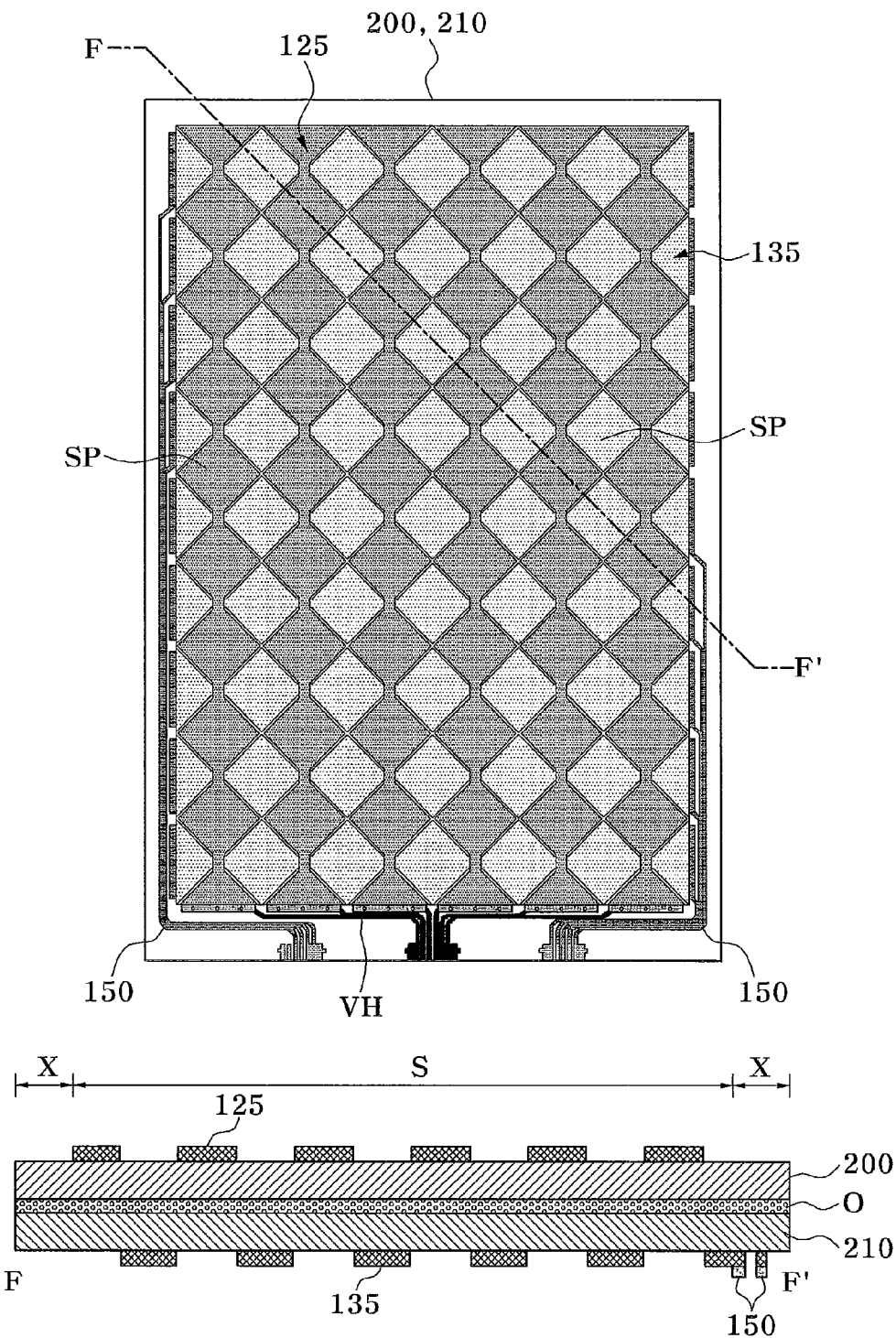

Referring to FIG. 32, the first and second transparent conductive layers 300 and 310 and the first and second metal layers 400 and 410 may be blanket-etched using a typical photolithography process to expose predetermined portions of the screen region S and the inactive region X of the first lateral surfaces of the first and second substrates 200 and 210. Thus, as shown in FIGS. 6 through 10, double-side exposure and etching processes may be performed so that a first transparent electrode pattern unit 220 may be formed on the screen region S of the first lateral surface of the first substrate 200 and simultaneously, a second transparent electrode pattern unit 230 may be formed on the screen region S of the first lateral surface of the second substrate 210. Also, by way of each of via holes VH formed in the inactive region X of the first lateral surface of the second substrate 210, a first outer electrode interconnection 240 may be formed to be electrically connected to each of first transparent electrode patterns 225 of the first transparent electrode pattern unit 220 and simultaneously, a second outer electrode interconnection 250 may be formed to be electrically connected to each of second transparent electrode patterns 235 of the second transparent electrode pattern unit 230.

Meanwhile, the first through fourth exemplary embodiments describe that the first and second substrates 100 and 110 (or 200 and 210) are bonded to each other by the interlayer adhesive O, but the present invention is not limited thereto. Thus, a single substrate may be adopted without using the interlayer adhesive O. As a result, the fabrication cost of a touch screen may be efficiently reduced, and the fabrication process of the touch-screen panel may be greatly simplified.

According to the present invention as described above, the fabrication cost of a touch screen can be efficiently reduced, and the fabrication process of a touch-screen panel can be greatly simplified.

According to the present invention, before patterning a touch screen, defects caused by air bubbles, alien substances, or scratches can be minimized using an interlayer roll-to-roll lamination process.

Furthermore, precise alignment margins can be maintained between first and second transparent electrode patterns, between the first and second transparent electrode patterns and first and second outer electrode interconnections, and between the first and second outer electrode interconnections using double-side exposure and etching processes.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of fabricating a capacitive touch-screen panel, comprising:

preparing a substrate having first and second lateral surfaces on which first and second transparent conductive layers for forming first and second transparent electrode pattern units are disposed, the substrate having a screen region and an inactive region;

depositing first and second metal layers for forming first and second outer electrode interconnections on exposed surfaces of the first and second transparent conductive layers; and performing double-side exposure and etching processes to form the first transparent electrode pattern unit and the first outer electrode interconnection on the screen region and the inactive region of the first lateral surface of the substrate, respectively, and simultaneously, form the second transparent electrode pattern unit and the second outer electrode interconnection on the screen region and the inactive region of the second lateral surface of the substrate, respectively, wherein the first and second outer electrode interconnections are electrically connected to the first and second transparent electrode pattern units, respectively, wherein in the etching process the first outer electrode interconnection and the first transparent electrode patterns are etched sequentially to have the same shape and to expose predetermined portions of the screen region and the inactive region, and the second outer electrode interconnection and the second transparent electrode patterns are etched sequentially to have the same shape and to expose predetermined portions of the screen region and inactive region.

2. The method of claim 1, wherein the substrate is a transparent film formed of at least one selected from the group consisting of PET, PI, acryl, PEN, and glass.

3. A method of fabricating a capacitive touch-screen panel, comprising:
  preparing a substrate having first and second lateral surfaces on which first and second transparent conductive layers for forming first and second transparent electrode pattern units are disposed, the substrate having a screen region and an inactive region;
  forming a plurality of through holes for forming a plurality of via holes on the inactive region of the substrate to penetrate the first and second transparent conductive layers;
  depositing first and second metal layers on exposed surfaces of the first and second transparent conductive layers having the respective through holes; and
  performing double-side exposure and etching processes to form the first transparent electrode pattern unit on the screen region of the first lateral surface of the substrate and simultaneously, form the second transparent electrode pattern unit on the screen region of the second lateral surface of the substrate, and to form first and second outer electrode interconnections on the inactive region of the second lateral surface of the substrate, wherein the first outer electrode interconnection is electrically connected to the first transparent electrode pattern unit through the via holes, and the second outer electrode interconnection is electrically connected to the second transparent electrode pattern unit, wherein in the etching process the first outer electrode interconnection and the first transparent electrode patterns are etched sequentially to have the same shape and to expose predetermined portions of the screen region and the inactive region, and the second outer electrode interconnection and the second transparent electrode patterns are etched sequentially to have the same shape and to expose predetermined portions of the screen region and inactive region.

4. The method of claim 3, further comprising bonding a single-sided external driver to the inactive region of the substrate to be electrically connected to the first and second outer electrode interconnections.

5. A method of fabricating a capacitive touch-screen panel, comprising:
  preparing a substrate having first and second lateral surfaces on which first and second transparent conductive layers for forming first and second transparent electrode pattern units are disposed, the substrate having a screen region and an inactive region;
  selectively depositing first and second metal layers for forming first and second outer electrode interconnections using first and second masks on predetermined exposed surfaces of the first and second transparent conductive layers formed on the inactive region of the substrate; and
  performing double-side exposure and etching processes to form the first transparent electrode pattern unit and the first outer electrode interconnection on the screen region and the inactive region of the first lateral surface of the substrate, respectively, and simultaneously, form the second transparent electrode pattern unit and the second outer electrode interconnection on the screen region and the inactive region of the second lateral surface of the substrate, respectively, wherein the first and second outer electrode interconnections are electrically connected to the first and second transparent electrode pattern units, respectively, wherein in the etching process the first outer electrode interconnection and the first transparent electrode patterns are etched sequentially to have the same shape and to expose predetermined portions of the screen region and the inactive region, and the second outer electrode interconnection and the second transparent electrode patterns are etched sequentially to have the same shape and to expose predetermined portions of the screen region and inactive region.

6. A method of fabricating a capacitive touch-screen panel, comprising:
  preparing a substrate having first and second lateral surfaces on which first and second transparent conductive layers for forming first and second transparent electrode pattern units are disposed, the substrate having a screen region and an inactive region;
  forming at least one through hole for forming at least one via hole on the inactive region of the substrate to penetrate the first and second transparent conductive layers;
  selectively depositing the first and second metal layers using first and second masks on predetermined exposed surfaces of the first and second transparent conductive layers formed on the inactive regions of the substrate; and
  performing double-side exposure and etching processes to form the first transparent electrode pattern unit on the screen region of the first lateral surface of the substrate and simultaneously, form the second transparent electrode pattern unit on the screen region of the second lateral surface of the substrate, and to form first and second outer electrode interconnections on the inactive region of the second lateral surface of the substrate, wherein the first outer electrode interconnection is electrically connected to the first transparent electrode pattern unit through the via hole, and the second outer electrode interconnection is electrically connected to the second transparent electrode pattern unit, wherein in the etching process the first outer electrode interconnection and the first transparent electrode patterns are etched sequentially to have the same shape and to expose predetermined portions of the screen region and the inactive region, and the second outer electrode interconnection and the second transparent electrode patterns are etched sequentially to have the same shape and to expose predetermined portions of the screen region and inactive region.

* * * * *